(12) United States Patent
Ishimaru et al.

(10) Patent No.: US 10,336,871 B2
(45) Date of Patent: Jul. 2, 2019

(54) HEAT-SHRINKABLE POLYESTER FILM AND PACKAGE

(71) Applicant: TOYOBO CO., LTD., Osaka-shi, Osaka (JP)

(72) Inventors: Shintaro Ishimaru, Tsuruga (JP); Masayuki Haruta, Tsuruga (JP); Yukinobu Mukoyama, Tsuruga (JP)

(73) Assignee: TOYOBO CO., LTD., Osaka (JP)

( * ) Notice: Subject to any disclaimer, the term of this patent is extended or adjusted under 35 U.S.C. 154(b) by 482 days.

(21) Appl. No.: 14/891,579

(22) PCT Filed: May 14, 2014

(86) PCT No.: PCT/JP2014/062793
§ 371 (c)(1),
(2) Date: Nov. 16, 2015

(87) PCT Pub. No.: WO2014/185442
PCT Pub. Date: Nov. 20, 2014

(65) Prior Publication Data
US 2016/0090456 A1   Mar. 31, 2016

(30) Foreign Application Priority Data

May 16, 2013   (JP) .................................. 2013-104466
Feb. 14, 2014   (JP) .................................. 2014-026788

(51) Int. Cl.
*C08J 5/18* (2006.01)
*C08G 63/183* (2006.01)
*C08G 63/60* (2006.01)

(52) U.S. Cl.
CPC .............. *C08J 5/18* (2013.01); *C08G 63/183* (2013.01); *C08G 63/60* (2013.01); *C08J 2367/02* (2013.01); *C08J 2467/02* (2013.01)

(58) Field of Classification Search
CPC ....... C08J 5/18; C08J 2467/02; C08J 2367/02; C08G 63/183; C08G 63/60
See application file for complete search history.

(56) References Cited

U.S. PATENT DOCUMENTS

2004/0180229 A1    9/2004   Hayakawa et al.
2004/0241470 A1 *  12/2004  Hayakawa .............. B29C 55/12
                                                    428/480
(Continued)

FOREIGN PATENT DOCUMENTS

CN           1529650 A        9/2004
JP       2001-192474 A        7/2001
(Continued)

OTHER PUBLICATIONS

Uenomachi, Kiyomi, "Shrinkage property control of heat-shrinkable polyester film," *Seikei-Kakou*, 6(10): 679-682 (1994).
(Continued)

*Primary Examiner* — James C Yager
(74) *Attorney, Agent, or Firm* — Leydig, Voit & Mayer, Ltd.

(57) ABSTRACT

Provided is a heat-shrinkable polyester film that suppresses deterioration of the shrinkage finish property associated with a decline in performance during aging and does not loosen even after being used as a label. This heat-shrinkable polyester film comprising a polyester of a predetermined composition fulfills all of the following: (1) a ratio A1/A2 of the absorbancy (A1) at 1340 cm$^{-1}$ and the absorbancy (A2) at 1410 cm$^{-1}$ of the film measured by polarized ATR-FTIR from 0.45 to 0.75 or from 0.40 to less than 0.45 in either the width direction or longitudinal direction of the film; (2) a ratio (shrinkage stress after 30 seconds/maximum shrinkage stress) of the shrinkage stress after 30 seconds when the film is heat shrunk for 30 seconds in 90° C. hot air (shrinkage stress after 30 seconds) and the maximum shrinkage stress (Continued)

of from 75% to 100%; and (3) a hot-water shrinkage in the width direction of from 30% to 55% when, after aging the film for 672 hours in a 30° C. 85% RH atmosphere, the aged film is dipped in 70° C. water for 10 seconds.

16 Claims, 3 Drawing Sheets

(56) References Cited

U.S. PATENT DOCUMENTS

| | | | |
|---|---|---|---|
| 2005/0023173 A1* | 2/2005 | Paoletti | B65D 55/0854 206/459.5 |
| 2009/0304997 A1 | 12/2009 | Haruta et al. | |
| 2012/0043248 A1 | 2/2012 | Haruta et al. | |

FOREIGN PATENT DOCUMENTS

| | | |
|---|---|---|
| JP | 2003-145619 A | 5/2003 |
| JP | 2005-047959 A | 2/2005 |
| JP | 2005-335111 A | 12/2005 |
| JP | 2008-291200 A | 12/2008 |
| WO | WO 2010/137240 A1 | 12/2010 |

OTHER PUBLICATIONS

Hummel et al., *Atlas of Polymer and Plastics Analysis* (Vchverlagsgesellschaft mbh 1991), pp. 370-371.
Japanese Patent Office, International Search Report in International Patent Application No. PCT/JP2014/062793 (dated Aug. 12, 2014).
Chinese Patent Office, The First Office Action in Chinese Patent Application No. 201480028241.5 (dated Jun. 6, 2017).
Todoki, "DSC(3)—Glass Transition of Polymers," *Journal of the Society of Fiber Science and Technology*, 65(10): 385-393 (2009).

* cited by examiner

[Fig. 1]
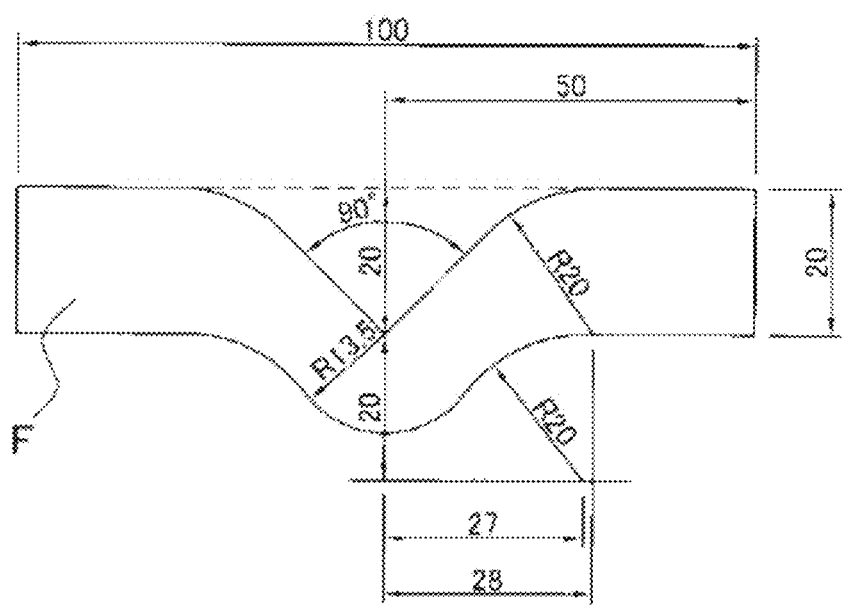

[Fig. 2]
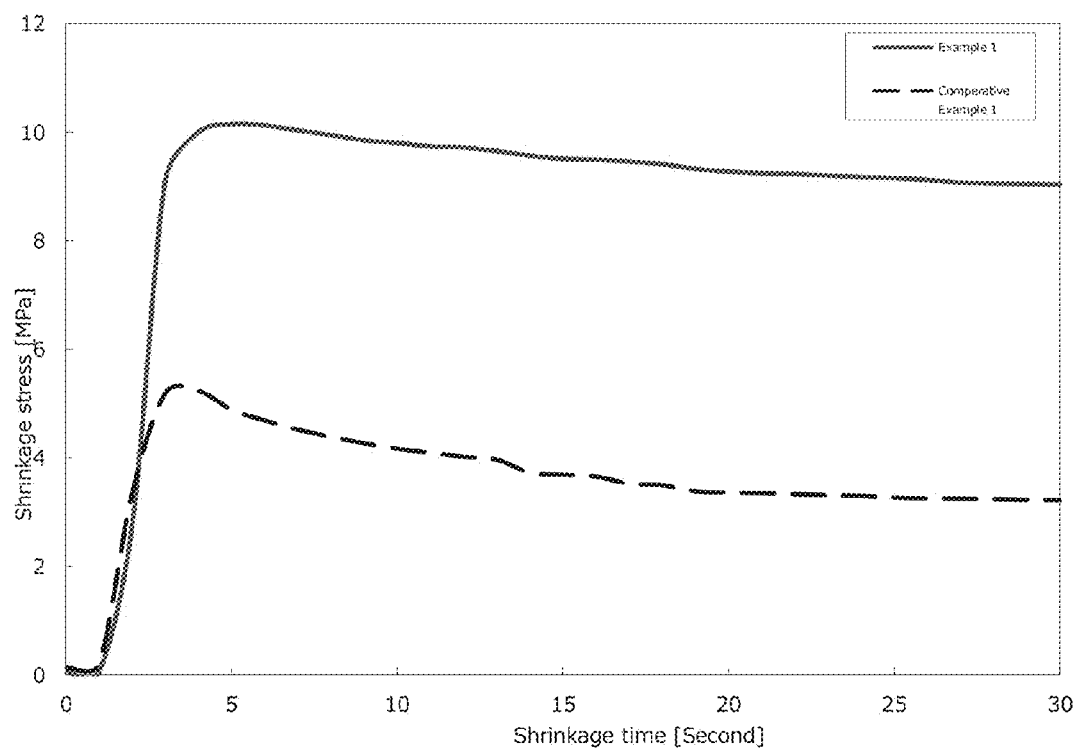

[Fig. 3]
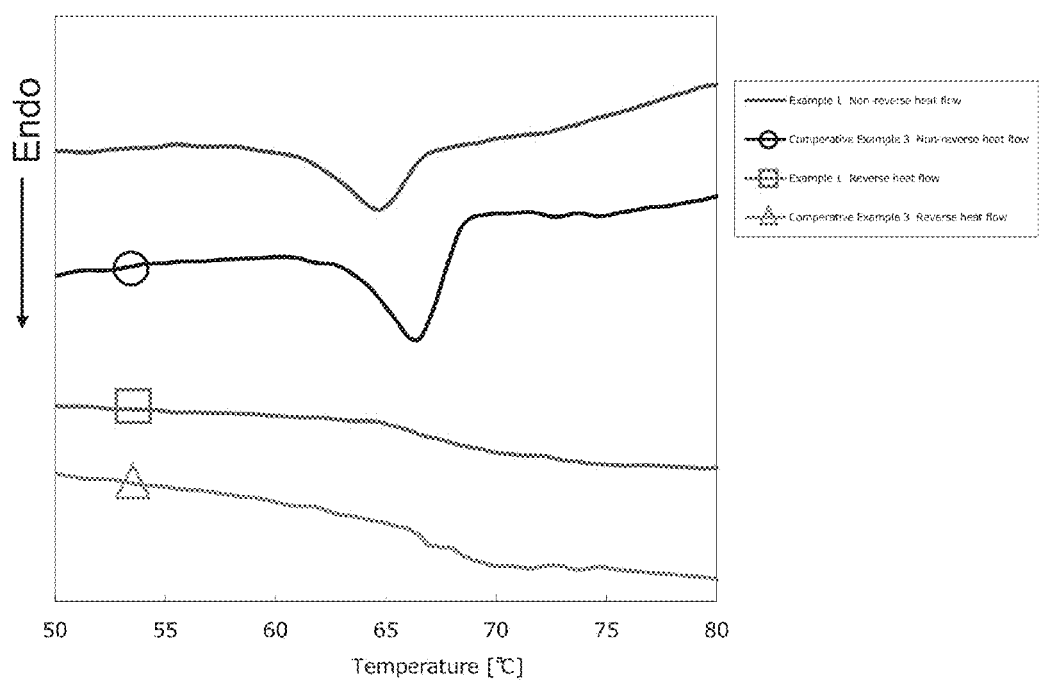

HEAT-SHRINKABLE POLYESTER FILM AND PACKAGE

CROSS-REFERENCE TO RELATED APPLICATIONS

This patent application is the U.S. national phase of International Patent Application No. PCT/JP2014/062793, filed May 14, 2014, which claims the benefit of Japanese Patent Application No. 2014-026788, filed on Feb. 14, 2014, and Japanese Patent Application No. 2013-104466, filed on May 16, 2013, which are incorporated by reference in their entireties herein.

TECHNICAL FIELD

The present invention relates to a heat-shrinkable polyester film and a package suitable label applications.

BACKGROUND ART

Recently in applications such as label package doubling as a protection of a glass bottle and a PET bottle etc. and display of articles, cap sealing and accumulation package, there have been widely used drawn films (so-called heat-shrinkable films) composed of a polyvinyl chloride resin, a polystyrene resin, a polyethylene resin or the like. Of these heat-shrinkable films, a polyvinyl chloride film has problems that heat resistance is low, and it generates hydrogen chloride gas in incineration and causes dioxin. A polystyrene film has problems that it is inferior in chemical resistance, as well as an ink with a special composition needs to be used in printing, it requires high temperature incineration and generates a lot of black smoke accompanied by an abnormal odor. Therefore, as a shrink label, there has been widely used a polyester-based heat-shrinkable film which is high in heat resistance, easy to incinerate, and excellent in solvent resistance, and the use amount tends to increase being accompanied by an increase in turn volume of PET containers.

However, with regard to the conventional heat-shrinkable polyester film, further improvement in its shrinkage properties has been desired. In particular, as compared with the heat-shrinkable polystyrene film, at the time of covering a container such as a PET bottle, a polyethylene bottle or a glass bottle with a film and shrinking the film, irregularity of shrinkage and wrinkles may be generated, and characters and designs which are printed on the film may be distorted, and there has been a demand on the user side for reducing the distortion as much as possible.

Incidentally, at the time of using a heat-shrinkable film in the process of covering a container, designs and the like are printed on the film as necessary, after which the film is formed into a shape of a label, a bag or the like to be attached to the container, and the label or the like is shrunk by heat with a heating apparatus called a shrinkage tunnel to be closely adhered to the container. Examples of this shrinkage tunnel include a steam tunnel for blowing steam and shrinking a film by heat and a hot air tunnel for blowing hot air and shrinking a film by heat.

The steam tunnel is more satisfactory in heat transfer efficiency than the hot air tunnel, is capable of shrinking a film more uniformly by heating, and is also capable of attaining a satisfactory finishing appearance. However, there has been a problem that even if a steam tunnel is used for a polyester film, the finish properties are slightly poor as compared with the case of a polyvinylchloride film or a polystyrene film.

Furthermore, there has also been a problem that when a hot air tunnel easily causing temperature unevenness rather than the steam tunnel is used and a polyester film is shrunk, shrinkage whitening, irregularity of shrinkage, wrinkles, distortions and the like are easily generated, and the film is poorer in finish properties than a polyvinylchloride film or a polystyrene film.

For the above-mentioned reasons, there has been proposed a method of incorporating a polyester elastomer in a polyester resin as the film raw material in order to improve the shrinkage finish properties of a heat-shrinkable polyester film (Patent Document 1).

However, when the heat-shrinkable polyester film described in Patent Document 1 is used as a label for a bottle such as a polyethylene-made bottle which easily expands by heat, there has been a problem that the slack of the label is generated since the bottle is cooled to room temperature or so and then the size of the bottle which has bee expanded in heating returns to its original size, even if the label has been closely adhered to the bottle at the time of being shrunk by heating, and this is not preferred from the viewpoints of the performance and the appearance. Moreover, since the heat-shrinkable polyester film described in Patent Document 1 is almost not drawn in the longitudinal direction which is a direction orthogonal to the width direction as the main shrinkage direction, there has also been a problem that the mechanical strength in the longitudinal direction is low and moreover the perforation openability is poor.

With regard to the perforation openability, after the application of Patent Document 1, an investigation has been subsequently conducted by the present applicant and so on, and there has been successfully provided a heat-shrinkable polyester film excellent in perforation openability shown in Patent Document 2.

However, other problems have been generated. That is, in general, a heat-shrinkable film is rarely used immediately after produced and is often used after being aged (long-term storage) for reasons such as the storage and the transporting process. However, the heat-shrinkable film causes natural shrinkage during aging even at a temperature a little higher than ordinary temperature since the heat-shrinkable film is a film which shrinks by heat, lowering in performance occurs, and the shrinkage finish properties deteriorate.

For example, Patent Document 3 discloses a technique for enhancing the shrinkage finish properties while paying attention to the endothermic peak amount (enthalpy relaxation amount) around the glass transition point of the film. However, the publication date of this technique is more than 10 years ago, and shrinkage finish properties at the level of the technique described in Patent Document 3 cannot meet the current user's demands.

PRIOR ART DOCUMENT

Patent Document

Patent document 1: JP-A No. 2005-335111
Patent document 2: International Publication No. 2010/137240
Patent document 3: JP-A No. 2001-192474

SUMMARY OF THE INVENTION

Problems to be Solved by the Invention

An object of the present invention is to solve the above-mentioned problems and to provide a heat-shrinkable polyester film in which the degradation in shrinkage finish properties caused by the lowering in performance during aging is suppressed and the slack is not caused even after the film is used as a label.

Means for Solving the Problem

The present invention to solve the above problems, a heat-shrinkable polyester film, having an ethylene terephthalate unit, and containing a constituent unit derived from butanediol in a content of 1 to 25% by mole, a constituent unit derived from ε-caprolactone in a content of 1 to 25% by mole, and a constituent unit derived from one or more monomers capable of forming an amorphous component other than the constituent units derived from butanediol and ε-caprolactone in a content not less than 18% by mole in 100% by mole of the whole polyester resin component, the heat-shrinkable polyester film satisfying the following requirements (1) to (3):

(1) the film has a ratio A1/A2 (absorbancy ratio) of an absorbancy A1 at 1340 cm$^{-1}$ to an absorbancy A2 at 1410 cm$^{-1}$ measured by a polarized ATR-FTIR method of not less than 0.45 and not more than 0.75 in either of the width direction and longitudinal direction of the film;

(2) the film has a ratio (shrinkage stress after 30 seconds/maximum shrinkage stress) of a shrinkage stress after 30 seconds when the film is heat shrunk in hot air of 90° C. for 30 seconds (shrinkage stress after 30 seconds) to the maximum shrinkage stress of not less than 75% and not more than 100%; and (3) the film has a hot-water heat shrinkage in the width direction of not less than 30% and not more than 55% when the film is aged for 672 hours in an atmosphere of 30° C. and 85% RH, and then the aged film is dipped in hot water of 70° C. for 10 seconds.

The present invention includes a heat-shrinkable polyester film, having an ethylene terephthalate unit, and containing a constituent unit derived from butanediol in a content of 1 to 25% by mole, a constituent unit derived from ε-caprolactone in a content of 1 to 25% by mole, and a constituent unit derived from one or more monomers capable of forming an amorphous component other than the constituent units derived from butanediol and ε-caprolactone in a content not less than 18% by mole in 100% by mole of the whole polyester resin component, the heat-shrinkable polyester film satisfying the following requirements (1'), (2) and (3):

(1') the film has a ratio A1/A2 (absorbancy ratio) of an absorbancy A1 at 1340 cm$^{-1}$ to an absorbancy A2 at 1410 cm$^{-1}$ measured by a polarized ATR-FTIR method of not less than 0.40 and less than 0.45 in either of the width direction and longitudinal direction of the film;

(2) the film has a ratio (shrinkage stress after 30 seconds/maximum shrinkage stress) of a shrinkage stress after 30 seconds when the film is heat shrunk in hot air of 90° C. for 30 seconds (shrinkage stress after 30 seconds) to the maximum shrinkage stress of not less than 75% and not more than 100%; and (3) the film has a hot-water heat shrinkage in the width direction of not less than 30% and not more than 55% when the film is aged for 672 hours in an atmosphere of 30° C. and 85% RH, and then the aged film is dipped in hot water of 70° C. for 10 seconds.

The heat-shrinkable polyester film preferably has a natural shrinkage in the width direction of not less than 0.3% and not more than 2% when the film is aged for 672 hours in an atmosphere of 40° C. and 65% RH.

The heat-shrinkable polyester film preferably has the difference between the absorbancy ratio in the width direction of the film and the absorbancy ratio in the longitudinal direction of the film of less than 0.15, a hot-water heat shrinkage in the width direction of not less than 30% and not more than 55% when the film is dipped in hot water of 70° C. for 10 seconds, a hot-water heat shrinkage in the width direction of not less than 40% and not more than 75% and a hot-water heat shrinkage in the longitudinal direction of not less than 0% and not more than 15% when the film is dipped in hot water of 98° C. for 10 seconds, a tensile breaking strength in the longitudinal direction of the film of not less than 80 MPa and not more than 200 MPa, and a right-angled tearing strength per unit thickness in the longitudinal direction of the film of not less than 180 N/mm and not more than 330 N/mm after the film is shrunk by 10% in the width direction in hot water of 80° C. as the preferred embodiments.

The present invention comprises a package, comprising a label that is prepared from the heat-shrinkable polyester film and that has a perforation or a notch, the label being formed by being allowed to cover at least a part of the outer periphery of an object to be packaged and then to shrink by heat.

Effects of the Invention

The heat-shrinkable polyester film according to the present invention has a characteristic that by forming a polyester with a specific composition into a film by a specific production method, the stress applied to polyester molecular chains constituting the film, particularly amorphous molecular chains (hereinafter, may be referred to simply as molecular chains) which are considered to be related to shrinkage, hardly relaxes before heat shrinkage or during aging, and after the stress applied to molecular chains is relaxed (the film is shrunk) in one sitting at the time of heat shrinkage, the relaxation of the heat shrinkage stress generated at that time becomes gentle. As described above, since the lowering in performance during aging is small, a package excellent in shrinkage finish properties can be obtained even in the case where the aged film is used.

Moreover, with regard to the heat-shrinkable polyester film according to the present invention, since the shrinkage stress is large even after 30 seconds from the initiation of shrinkage, by attaching a label to container which easily expands with heat, the attenuation rate of the label shrinkage stress becomes small. This means that even if the container is to expand with heat at the time of heating in the label attaching process, the label is firmly and closely adhered to the container to the extent that this heat expansion can be suppressed, and as a result thereof, since there is little shrinkage of the container even when the container is cooled, the slack of the label is not generated and satisfactory appearance can be attained. Furthermore, since the heat-shrinkable polyester film according to the present invention is a film produced by being biaxially drawn length wisely and transversely, the film can be very efficiently produced and can be suitably used for applications such as various cover labels including a label for a bottle such as a polyethylene-made bottle which easily expands by heat, a cap seal and shrink packaging.

BRIEF DESCRIPTION OF THE DRAWINGS

FIG. 1 is an explanatory illustration showing a shape of a test specimen for the measurement of the right-angled tearing strength (In this connection, the unit of the length of each portion of the test specimen in the Figure is mm, and R denotes the radius).

FIG. 2 shows shrinkage stress curves of the films in Example 1 and Comparative Example 1.

FIG. 3 shows reverse heat flow charts and non-reverse flow charts obtained from the temperature modulated DSC measurement for the films in Example 1 and Comparative Example 3.

MODE FOR CARRYING OUT THE INVENTION

1. Raw Material Polyester for Heat-Shrinkable Polyester Film

The polyester used in the heat-shrinkable polyester film of the present invention is a polyester that has an ethylene terephthalate Ethylene terephthalate unit is preferably 40% by mole or more, more preferably 50% by mole or more, furthermore preferably 55% by mole or more in the constituent unit of 100% by mole.

Moreover, it is important that the heat-shrinkable polyester film according to the present invention contain a constituent unit derived from butanediol (1,4-butanediol) in a content of 1 to 25% by mole and constituent unit derived from ε-caprolactone in a content of 1 to 25% by mole in 100% by mole of the whole polyester resin component. Since the stress applied to polyester molecular chains extended to some extent by drawing before heat shrinkage becomes difficult to relax even during aging by using butanediol and ε-caprolactone together and adopting a drawing method described later, it has been possible to provide a film in which the heat shrinkage rate is hardly lowered in a low temperature region and the natural shrinkage is small.

Although there has hitherto been a problem that a film shrinks naturally during aging when the amount of the amorphous component in the polyester is increased in order to secure the low temperature shrinkability, it has been possible to secure the low temperature shrinkage rate and to suppress the natural shrinkage since the heat-shrinkable film of the present invention has feature of hardly causing the stress applied to amorphous molecular chains before heat shrinkage to relax. Furthermore, this film can exhibit heat shrinkage force over a certain period of time even after heat shrinkage. That is, as described later, there has been successfully provided an unprecedented heat-shrinkable film in which the attenuation amount of shrinkage stress after heat shrinkage is small.

It is considered that various effects mentioned above are developed by allowing components differing in the number of carbon atoms of the molecular main chain, such as butanediol and ε-caprolactone, to mixedly coexist as polyhydric alcohol components other than ethylene glycol, and performing biaxial drawing after the film formation. In the heat-shrinkable polyester film, there are a large number of molecular main chains between two ester bonds of the polyester, the molecular main chain may be extended by drawing or stress may be applied to the molecular main chain, and the stress may be relaxed. It is considered that since the molecular main chain of each of butanediol and ε-caprolactone is longer than that of ethylene glycol, these molecular main chains differing in length exhibit different behaviors respectively at the time of drawing and stress relaxation. Moreover, it is considered that molecular main chains differing in length are oriented in two axial directions in the film plane by performing biaxial drawing, and distribution of energies required for relaxing the stress in respective polyester molecular chains is generated. Even when the same quantity of energy is given to the whole face of such a heat-shrinkable polyester film according to the present invention, since stresses applied to a large number of molecular chains are not uniformly relaxed in the whole film, it is presumed that the enthalpy relaxation during aging and the attenuation of stress at the time of shrinkage become gentle. It is considered that with these mechanisms, even when a film is shrunk by heat after aging, the effect of making the film excellent in shrinkage finish properties is exerted.

When each of the amounts of butanediol and ε-caprolactone is smaller than 1% by mole in 100% by mole of the polyhydric alcohol component, the above-mentioned effect of suppressing relaxation is not developed, and insufficient shrinkage and poor shrinkage finish properties are caused. Moreover, when each of the amounts thereof is more than 25% by mole, it is not preferred because the breakage resistance, the film strength, the heat resistance and the like are insufficient since the ethylene terephthalate unit having a function of imparting physical strength is relatively reduced. It is preferred that each of the amounts of butanediol and ε-caprolactone be not less than 5% by mole. It is preferred that the amount of ε-caprolactone be not more than 20% by mole. Moreover, it is preferred that the sum of both the amounts be not more than 45% by mole. This is because the lowering in heat resistance and strength due to too small an amount of the ethylene terephthalate unit can be prevented.

With regard to the polyester of the present invention, furthermore, it is also necessary that the content (total amount) of a unit derived from one or more monomers capable of forming an amorphous component other than the units derived from butanediol and ε-caprolactone be not less than 18% by mole in 100% by mole of the whole polyester resin component. When the amount of the amorphous component is less than 18% by mole, the heat shrinkage properties are poor. The amount of the monomer capable of forming an amorphous component is preferably not less than 20% by mole and not more than 25% by mole in 100% by mole of the polyhydric alcohol component or in 100% by mole of the polycarboxylic acid component in the whole polyester resin.

As a monomer capable of forming an amorphous component, for example, there can be listed neopentyl glycol, 1,4-cyclohexanedimethanol, isophthalic acid, 1,4-cyclohexanedicarboxylic acid, 2,6-naphthalenedicarboxylic acid, 2,2-diethyl-1,3-propanediol, 2-n-butyl-2-ethyl-1,3-propanediol, 2,2-isopropyl-1,3-propanediol, 2,2-di-n-butyl-1,3-propanediol, 1,4-butanediol and hexanediol, and among these, neopentyl glycol, 1,4-cyclohexanedimethanol isophthalic acid is preferably.

In the case where the monomer capable of forming an amorphous component is isophthalic acid, terephthalic acid and isophthalic acid are combinedly used as the dicarboxylic acid component, and ethylene glycol, butanediol and ε-caprolactone are combinedly used as the diol component, a constituent unit composed of terephthalic acid and butanediol, a constituent unit composed of isophthalic acid and butanediol, a constituent unit composed of isophthalic acid and ethylene glycol, and the like mixedly coexist in the polyester resin constituting the film.

In this context, the constituent unit composed of isophthalic acid and butanediol is a constituent unit derived from butanediol, and is also a constituent unit derived from one or more monomers capable of forming an amorphous component. Accordingly, in the present invention, the content ratio of a constituent unit composed of isophthalic acid and butanediol shall be counted as that of a constituent unit derived from butanediol, and also shall be counted as that of a constituent unit derived from one or more monomers capable of forming an amorphous component. Thus, the content ratio of a constituent unit derived from butanediol refers to the total content ratio of the content ratio of a constituent unit composed of isophthalic acid and butanediol, and the content ratio of a constituent unit composed of terephthalic acid and butanediol. And then, the content ratio of a constituent unit derived from one or more monomers capable of forming an amorphous component refers to the total content ratio of the whole content ratio of a constituent unit derived from one or more monomers capable of forming an amorphous component including the content ratio of a constituent unit composed of isophthalic acid and butanediol and the content ratio of a constituent unit composed of isophthalic acid and ethylene glycol. The same holds true for the relationship between the content ratio of a constituent unit derived from ε-caprolactone and the content ratio of a constituent unit derived from one or more monomers capable of forming an amorphous component.

Other than the above, dicarboxylic acid components constituente the polyester of the present invention can include aromatic dicarboxylic acids such as orthophthalic acid; aliphatic dicarboxylic acids such as adipic acid, azelaic acid, sebacic acid and decanedicarboxylic acid; and alicyclic dicarboxylic acid.

In the case of containing the aliphatic dicarboxylic acids (for example, adipic acid, sebacic acid and decanedicarboxylic acid etc.), the content is preferably less than 3% by mole. A heat-shrinkable polyester film obtained by using a polyester that contains 3% by mole or more of these aliphatic dicarboxylic acids is insufficient in film stiffness at high-speed attachment.

Further, it is preferable not to contain polybasic carboxylic acids of tribasic or more (far example, trimellitic acid, pyromellitic acid and anhydride thereof etc.). A heat-shrinkable polyester film obtained by using a polyester containing these polybasic carboxylic acids is hard to achieve a necessary high shrinkage.

Examples of the polyhydric alcohol component which constitutes the polyester other than those mentioned above include an aromatic diol such as bisphenol A.

The polyester used in the present invention is preferably a polyester prepared by appropriately selecting the amounts of butanediol and ε-caprolactone and the amount of a monomer capable of forming an amorphous component, and adjusting the glass transition point (Tg) within 50 to 80° C.

In a polyester used in the heat-shrinkable polyester film of the present invention, it is preferable not to contain diols having 8 or more carbon atoms (for example, octanediol etc.) or polyhydric alcohols of trihydric or more (for example, trimethylolpropane, trimethylolethane, glycerin, diglycerin etc.). A heat-shrinkable polyester film obtained by using polyester containing these diols or polyhydric alcohols is hard to achieve a necessary high shrinkage. Further, in the polyester, it is preferable not to contain diethylene glycol, triethylene glycol and polyethylene glycol as far as possible.

The most preferred polyester is a polyester containing a butylene terephthalate unit in a content of 1 to 25% by mole, a unit composed of ε-caprolactone and terephthalic acid in a content of 1 to 25% by mole, the sum of these being 2 to 50% by mole, a unit composed of a monomer capable of forming an amorphous component and terephthalic acid in a content of 18 to 25% by mole, and the rest being an ethylene terephthalate unit in 100% by mole of the whole polyester constituent units. In this connection, an amorphous unit in which a part of terephthalic acid is substituted with isophthalic acid may be contained.

To a resin for forming the heat-shrinkable polyester film of the present invention, according to needs, there can be added various additives, such as waxes, an antioxidant, an antistatic agent, a crystal-nucleation agent, a viscosity reducing agent, a heat stabilizer, a pigment for coloring, a color protection agent, and an ultraviolet absorber.

By adding fine particles as lubricant to a resin for forming the heat-shrinkable polyester film of the present invention, it is preferable to make workability (slipperiness) of the film better. The fine particles can be arbitrarily selected, for example, as inorganic fine particles, silica, alumina, titanium dioxide, calcium carbonate, kaolin, barium sulfate and the like can be listed. As organic fine particles, for example, an acrylic resin particle, a melamine resin particle, a silicone resin particle, a crosslinked polystyrene particle and the like can be listed. The average particle diameter of the fine particles is in a range of 0.05 to 3.0 μm (when measured by coulter counter), and it can be suitably selected according to need.

As a method for compounding the above-described particles in a resin for forming the heat-shrinkable polyester film, for example, they can be added in an arbitrary step in production of the polyester resin, but they are preferably added in a step of esterification, or in a step before start of polycondensation reaction after completion of ester exchange reaction as slurry dispersed in ethylene glycol etc., followed by carrying out polycondensation reaction. Further, it is also preferably carried out by a method in which slurry of particles dispersed in ethylene glycol, water or the like and raw materials of polyester resin are mixed using a kneading extruder with a vent, or a method in which dried particles and raw materials of polyester resin are mixed using a kneading extruder.

It is also possible to conduct corona treatment, coating treatment, frame treatment etc. on the heat-shrinkable polyester film of the present invention in order to enhance adhesiveness of film surface.

2. Properties of the Heat-Shrinkable Polyester Film of the Present Invention 2.1 Ratio of the Shrinkage Stress With regard to the heat-shrinkable polyester film (one which has not been subjected to an aging atmosphere) according to the present invention, the shrinkage stress in the main shrinkage direction (hereinafter, the width direction) measured in hot air of 90° C. is preferably not less than 75% and not more than 100% relative to the maximum shrinkage stress even after 30 seconds from the initiation of measurement. That is, the heat-shrinkable polyester film according to the present invention features specific heat shrinkage properties such that the shrinkage stress almost comparable to the maximum heat shrinkage stress is developed even at the end of 30 seconds after the film begins to shrink by heat (Example 1 in FIG. 2). In this connection, the maximum heat shrinkage stress is usually observed within 10 seconds after the initiation of measurement. In a conventional heat-shrinkable film, immediately after the maximum heat shrinkage stress is observed, the shrinkage stress begins to be attenuated (Comparative Example 1 in FIG. 2). In order to prevent such a situation that at the time of covering a bottle with a label and shrinking the label by heating, the followability of the label becomes poor in the case where the bottle is allowed to expand by heating and the label is slackened when the temperature of the bottle is lowered after shrinkage and then the heat expansion is eliminated, the shrinkage stress after 30 seconds/maximum shrinkage stress (hereinafter, the stress ratio) of the heat-shrinkable polyester film is preferably not less than 75%. The stress ratio is more preferably not less than 77%, further preferably not less than 80%, and particularly preferably not less than 85%. Although a higher stress ratio is preferred because the followability is more improved, it is improbable that the shrinkage stress at the end of 30 seconds exceeds the maximum shrinkage stress, and therefore the upper limit thereof is 100%. In this connection, the absolute value of the maximum shrinkage stress is preferably not less than 5.5 MPa and not more than 15 MPa, and more preferably not less than 7 MPa and not more than 12 MPa. At the time of heat shrinkage, by allowing the label to be firmly wound around a bottle to restrain the heat expansion of the bottle, the label can be suppressed from slackening after the bottle is cooled. However, there is a case where the above-mentioned effect is insufficient when the maximum shrinkage stress at 90° C. in the width direction of the film is less than 5.5 MPa. The maximum shrinkage stress at 90° C. is more preferably not less than 7 MPa and more further preferably not less than 8 MPa. Conversely when the maximum shrinkage stress at 90° C. is more than 15 MPa, it is not preferred because the film is no longer allowed to gently shrink and strains become easy to be generated on the label after heat shrinkage. The maximum shrinkage stress at 90° C. is more preferably not more than 12 MPa.

2.2 Absorbency Ratio

With regard to the heat-shrinkable polyester film according to the present invention, the ratio A1/A2 of an absorbancy A1 at 1340 $cm^{-1}$ to A2 at 1410 $cm^{-1}$ obtained when measured by polarized ATR-FTIR method (hereinafter, the absorbancy ratio) needs to be not less than 0.45 and not more than 0.75 in the main shrinkage direction (the width direction) and the orthogonal to the main shrinkage direction (hereinafter, the longitudinal direction).

The absorbancy ratio represents the trans conformation ratio of the molecular orientation. It has hitherto been considered that the amorphous orientation related to the shrinkage is affected by the gauche conformation ratio. However, in an article by Kiyomi UENOMACHI, ("Shrinkage property control of heat-shrinkable polyester film", Seikeikakou. Vol. 6, No. 10, (1994), p. 679-682), there is almost no change in the gauche conformation ratio even when the film-forming conditions are modified to change the shrinkage, and a ratio which is changed by the modification of film-forming conditions is the trans conformation ratio. The heat-shrinkable film described in this article is a uniaxially drawn film drawn only in the width direction which is the main shrinkage direction, and is not a film that satisfies various properties required for the heat-shrinkable polyester film. As such, the present inventors have focused their attention on the molecular orientation (the trans conformation ratio) in a film drawn in two axial directions of the longitudinal direction (MD direction) and the width direction (TD direction), and have conducted studies on the trans conformation ratio of the longitudinal direction and the width direction in order to ascertain what kind of molecular orientation is the molecular orientation exhibiting suitable heat shrinkage properties. Thus the present invention has been completed.

That is, the present inventors have obtained experimental results that the change in trans conformation ratio is related to the shrinkage by allowing the drawing temperature and the like to be modified. Accordingly, it is considered that a ratio which represents the molecular orientation related to the heat shrinkage is the trans conformation ratio. It is considered that the trans conformation represents the state of oriented molecular chains, and when the trans conformation ratio is high, the degree of orientation of molecular chains is also high. In the above article, it is considered that the ease of shrinkage varies with the difference of the structure of the molecular chain (the length of the rotational isomer) in the case where polyester prepared with amorphous monomers is used as a raw material. Therefore, when the orientation of molecular chains easy to shrink is high in a film production process, by applying sufficient heat to relax the stress applied to the molecular chains (=shrink the molecular chains), the stress applied to the molecular chains is relaxed and is reduced (the change in molecular chains becomes large), and it is considered that the shrinkage is also increased.

Moreover, in the above article, the absorbancy ratio of the trans conformation is determined from a ratio of 795 $cm^{-1}$ and 975 $cm^{-1}$. However, there are also several other absorbencies that can be employed for measuring the trans conformation ratio. In the present invention, as a result of determining a trans conformation index from a plurality of absorbancy ratios with reference to the document {Atlas of polymer and plastic analysis: Vch verlagsgesellschaft mbh, 370 (1991)}, since the absorbancy ratio of 1340 $cm^{-1}$ and 1410 $cm^{-1}$ has the greatest difference between values, the trans conformation ratio is determined from this absorbancy ratio. That is, in the present invention, this absorbancy ratio is defined as the trans conformation ratio.

In the present invention, the absorbancy ratio preferably falls within the range of 0.45 to 0.75 in either of the width direction and longitudinal direction of the film. When the absorbancy ratio in the width direction of the film is less than 0.45, the hot-water heat shrinkage at 70° C. before aging is small since the molecular orientation is low, and the hot-water heat shrinkage at 70° C. after aging is too small since the hot-water heat shrinkage at 70° C. is further smaller after aging rather than before aging. The absorbancy ratio in the width direction of the film is preferably not less than 0.48, and more preferably not less than 0.5. On the other hand, in the case where the absorbancy ratio in the width direction of the film is more than 0.75, it is not preferred because the orientation of the film progresses excessively (oriented crystallization), and whitening of the film and lowering in shrinkage occur. The absorbancy ratio in the width direction is preferably not more than 0.72, and more preferably not more than 0.7.

On the other hand, when the absorbancy ratio in the longitudinal direction of the film is less than 0.45, the tensile breaking strength in the longitudinal direction is small since the molecular orientation is low, and the strength in the longitudinal direction may become insufficient. Furthermore, when the absorbancy ratio in the longitudinal direction is less than 0.45, it is not preferred because the right-angled tearing strength is large and the perforation opening ratio is lowered. Furthermore, it is not preferred because the above-mentioned shrinkage stress ratio is also lowered. Since the shrinkage of molecules in the width direction becomes gentle at the time of shrinking the film by heating by allowing the molecules to be oriented also in the longitudinal direction, it is considered that the lowering in shrinkage stress is reduced and the shrinkage stress ratio can be maintained high (at not less than 75%). The absorbancy ratio in the longitudinal direction of the film is preferably not less than 0.48, and more preferably not less than 0.5. Moreover, since the molecular orientation is high when the absorbancy ratio in the longitudinal direction of the film is higher than 0.75, it is preferred in the point that the tensile breaking strength in the longitudinal direction is also increased, but when the absorbancy ratio is too high, it is not preferred because whitening of the film easily occurs. The absorbancy ratio in the longitudinal direction is preferably not more than 0.73, and more preferably not more than 0.71.

However, as a result of subsequent researches, it has been found that even in a film having an absorbancy ratio of not less than 0.40 and less than 0.45 in either of the width direction and longitudinal direction, the film has a certain level of molecular orientation, and a practically sufficient hot-water heat shrinkage at 70° C. is exhibited before aging and after aging. Accordingly, the film having an absorbancy ratio of not less than 0.40 and less than 0.45 in either of the width direction and longitudinal direction is also included within the scope of the present invention. In the following description, the "heat-shrinkable polyester film according to the present invention" shall refer to a film having an absorbancy ratio of not less than 0.40 and not more than 0.75.

In the present invention, as described later, a film is drawn in the longitudinal direction thereof, after which the film is drawn in the width direction thereof. In general, a conventional heat-shrinkable film is a uniaxially drawn film drawn in the width direction, and in such a uniaxially drawn film, the strength in the undrawn direction is insufficient since only the orientation in the drawing direction, namely, the trans conformation ratio (absorbancy ratio) in the width direction, is high. In the present invention, since the film is drawn in the longitudinal direction and width direction, values of trans conformation ratios in both directions are close to each other, and a film excellent in the balance of the strength is attained.

The difference between the absorbancy ratio in the width direction of the film and the absorbancy ratio in the longitudinal direction of the film is preferably less than 0.15. Usually with regard to the film drawn in two axial directions, when the draw ratios at the first drawing and second drawing are close to each other, it is common that the orientation in the width direction which is the final drawing direction is high. However, in the present invention, the film is characterized in that the difference in orientation between the width direction and the longitudinal direction is small. The reason why the orientation in the final drawing direction of a common biaxially drawn film is high is that the drawing stress in a direction at the second drawing is higher than the drawing stress at the first drawing.

In contrast, in the present invention, as described above, butanediol and ε-caprolactone having a molecular chain longer than that of ethylene glycol are essentially included, and units derived from these components mixedly coexist. Therefore, the drawing stress at the second drawing is small, and it is presumed that the difference between the degrees of orientation (absorbancy ratios) in the width direction and longitudinal direction becomes a small value of less than 0.15. It is considered that being small in this difference between the degrees of orientation (absorbancy ratios) in the width direction and longitudinal direction is an index indicating how the molecular chains of the polyester of the present invention are extended, namely, that the molecular chains are drawn in both of the width direction and longitudinal direction. The difference between the absorbancy ratios in the width direction and longitudinal direction is more preferably not more than 0.1, and further preferably not more than 0.07.

2.3 Hot-water Heat Shrinkage at 70° C. in Width Direction of Film after Aging

With regard to the heat-shrinkable polyester film according to the present invention, since the lowering in performance during aging is small, the heat shrinkage in the width direction (the main shrinkage direction) of the film which is calculated from the lengths before and after shrinkage obtained by aging the film for 672 hours in an atmosphere of 30° C. and 85% RH, dipping the aged film in a no-load state in hot water of 70° C. for 10 seconds, and immediately dipping the film in water of 25° C.±0.5° C. for 10 seconds according to the following Equation 1 (namely the hot-water heat shrinkage at 70° C.) is preferably not less than 30% and not more than 55%.

Hot-water heat shrinkage={(length before shrinkage−length after shrinkage)/length before shrinkage}×100(%)  Equation 1

When the hot-water heat shrinkage at 70° C. in the width direction of the film is small, at the time of covering a container or the like with a film and shrinking the film, there is a possibility that the shrinkage force of the film is insufficient, the film is not beautifully and closely adhered to the container, and a poor appearance occurs. Therefore, the hot-water heat shrinkage at 70° C. is preferably not less than 30%. On the other hand, when the hot-water heat shrinkage at 70° C. in the width direction of the film is too large, jumping of the label occurs at an early stage of the shrinkage, and therefore, the hot-water heat shrinkage at 70° C. is preferably not more than 55%. The heat shrinkage is more preferably not less than 32%, further preferably not less than 34%, more preferably not more than 53%, and further preferably not more than 50%.

The hot-water heat shrinkage at 70° C. in the width direction of the heat-shrinkable polyester film (one which has not been subjected to an aging atmosphere) according to the present invention is preferably not less than 30% and not more than 55% for the same reason as above.

2.4 Difference Between Enthalpy Relaxation Amounts after Aging

With regard to the heat-shrinkable polyester film according to the present invention, the enthalpy relaxation amount after the film is aged for 672 hours in an atmosphere of 30° C. and 85% RH is preferably not more than 4.0 J/g. According to Patent Document 3 and an article by Minoru TODOKI ("DSC (3) -Glass transition behavior of polymer-," Journal of the Society of Fiber Science and Technology, Vol. 65, No. 10, (2009), p. 385-393), the non-reverse heat flow obtained from the temperature modulated DSC measurement shown in FIG. 3 reveals that an endothermic peak observed around the glass transition point indicates the enthalpy relaxation. The enthalpy relaxation amount can be determined by calculating the integral of the peak area. The detailed measurement method will be described later. The enthalpy relaxation comes from the reduction in free volume of the amorphous part, and appears as the endothermic peak in the course of DSC temperature increase since molecular chains become difficult to move in proportion to the volume decrement. In the heat-shrinkable polyester film, it is thought that the larger the enthalpy relaxation amount is, the more difficult it is to move the amorphous molecular chains contributing to shrinkage, and the film tends to deteriorate in shrinkage properties. Therefore, in the present invention, the enthalpy relaxation amount after aging is preferably not more than 4.0 J/g. The enthalpy relaxation amount after aging is more preferably not more than 3.8 J/g, and further preferably not more than 3.5 J/g. In this connection, the enthalpy relaxation amount of a film not subjected to aging under the above-mentioned conditions is not more than 0.1 J/g.

2.5 Natural Shrinkage of Film after Aging

With regard to the heat-shrinkable polyester film according to the present invention, the natural shrinkage in the width direction of the film after the film is aged for 672 hours in an atmosphere of 40° C. and 65% RH is preferably not less than 0.3% and not more than 2.0%. As described above, in the heat-shrinkable polyester film according to the present invention, since polyesters differing in length of the molecular chain are oriented in two axial directions, the enthalpy relaxation is hardly caused during aging. Therefore, the lowering in performance during aging is small and the shrinkage amount of the film during aging is small. Accordingly, in the present invention, the natural shrinkage lies within a preferred range of not less than 0.3% and not more than 2%. In this connection, as described later, the natural shrinkage is determined from the length in the width direction of a sample before aging and the length of the sample after allowed to stand for 672 hours in an atmosphere of 40° C. and 65% RH by the following Equation 2.

Natural shrinkage={(length before aging length after aging)/length before aging}×100(%)  Equation 2

In the case where the natural shrinkage is more than 2%, it is not preferred because when storing a heat-shrinkable polyester film wound into a roll, tight winding occurs and wrinkles are easily generated in the film roll. The natural shrinkage is more preferably not more than 1.8%, and further preferably not more than 1.6%. Although it is preferred to make the natural shrinkage smaller, practically, the lower limit thereof is 0.3% or so.

2.6 Hot-water Heat Shrinkage at 98° C. in Longitudinal Direction of Film

With regard to the heat shrinkable polyester film according to the present invention, the heat shrinkage in the longitudinal direction (the direction orthogonal to the main shrinkage direction) of the film which is calculated from the lengths before and after shrinkage obtained by dipping the film in a no-load state in hot water of 98° C. for 10 seconds and immediately dipping the film in water of 25° C.±0.5° C. for 10 seconds according to the above-mentioned Equation 1 is preferably not less than 0% and not more than 15%. In this context, allowing the heat shrinkage in the longitudinal direction to be smaller than 0% (negative) means allowing the film to extend along the circumferential direction of the container, and it is not preferred because wrinkles are generated and a poor appearance easily occurs. Moreover, when the heat shrinkage is more than 15%, it is not preferred because strains are easily generated at the time of shrinkage. A more preferred range of the hot-water heat shrinkage at 98° C. in the longitudinal direction of the film is not less than 2% and not more than 14%, and a further preferable range thereof is not less than 3% and t more than 13%.

2.7 Tensile Breaking Strength in Longitudinal Direction of Film

In the heat-shrinkable polyester film of the present invention, when tensile breaking strength in the longitudinal direction is preferably 80 MPa or more and 200 MPa or less. The measurement for the tensile breaking strength is performed by a method described in Examples. When the tensile breaking strength in the longitudinal direction is less than 80 MPa, it is not preferable because "stiffness" becomes weak when attached on a bottle etc. as a label, conversely when the tensile breaking strength is more than 200 MPa, it is not preferable because cutting property (easiness of tearing) become bad at an early stage of tearing a label. The tensile breaking strength is preferably 90 MPa or more, more preferably 100 MPa or more. A label which is high in tensile breaking strength is preferred because the higher the tensile breaking strength is, the stronger the "stiffness" of the label becomes. However, the upper limit of the tensile breaking strength is set to 200 MPa since it is difficult to allow the film with a molecular design of the present invention to have a tensile breaking strength more than 200 MPa.

2.8 Right-Angled Tearing Strength in Longitudinal Direction of Film

In the heat-shrinkable polyester film of the present invention, when right-angled, tearing strength per unit thickness in the longitudinal direction after being shrunk by 10% in the width direction in hot water at 80° C., the right-angled tearing strength per unit thickness in the longitudinal direction is preferable 180 N/mm or more and 330 N/mm or less. The measurement for the right-angled tearing strength is performed by a method described in Examples.

When the right-angled tearing strength is less than 180 N/mm, a situation in which the film is easily torn by an impact such as falling during transportation is possibly caused when the film is used as a label, whereby the case is unpreferred. In order to prevent from coming to have poor cutting property (easiness of tearing) at an early stage of tearing a label, the right-angled tearing strength is preferably 330 N/mm or less. The right-angled tearing strength is more preferably 1.85 N/mm or more, further preferably 190 N/mm or more. The right-angled tearing strength is more preferably 325 N/mm or less, and further preferably 320 N/mm or less.

2.9 Hot-water Heat Shrinkage at 98° C. in Width Direction of Film

With regard to the heat-shrinkable polyester film according to the present invention, the heat shrinkage (hot-water heat shrinkage) in the width direction of the film which is calculated from the lengths before and after shrinkage obtained by dipping the film in a no-load state in hot water of 98° C. for 10 seconds and immediately dipping the film in water of 25° C.±0.5° C. for 10 seconds according to the above-mentioned Equation 1 is preferably not less than 40% and not more than 75%.

When the hot-water heat shrinkage at 98° C. in the width direction is less than 40%, in the case where the film is used as a label, there is a possibility that wrinkles and slack are generated on the label after heat shrinkage, since the shrinkage amount is small. The hot-water heat shrinkage at 98° C. is preferably not less than 44%, and further preferably not less than 45%. Conversely, when the hot-water heat shrinkage at 98° C. in the width direction is more than 75%, strains may be generated on the label after shrinkage. The hot-water heat shrinkage at 98° C. is preferably not more than 73%, and further preferably not more than 71%.

2.10 Other Properties

The thickness of the heat-shrinkable polyester film of the present invention is not particularly limited, but 10 μm or more and 200 μm or less is preferable, and 20 μm or more and 100 μm or less is more preferable. The heat-shrinkable polyester film of the present invention preferably has a haze value of 2% or more and 13% or less. When the haze value exceeds 13%, it is not preferable because transparency becomes bad, so that there is a probability that appearance becomes bad in a label production. Additionally, the haze value is more preferably 11% or less, and particularly preferably 9% or less. Further, the smaller the haze value, the better, but the lower limit is about 2%, from considerations that a predetermined amount of a lubricant may be added to the film in order to provide slipperiness necessary for practical use or the like.

3 Method for Producing the Heat-shrinkable Polyester

In a method for producing the heat-shrinkable polyester film of the present invention, the foregoing polyester raw material is melt-extruded by an extruder to form an undrawn film, and the undrawn film is biaxially drawn by a predetermined method shown below and heat-treated. In this connection, polyester can be obtained by allowing the suitable dicarboxylic acid component and diol component mentioned above to undergo a polycondensation by a known method. Moreover, usually, two or more kinds of chip-like polyesters are mixed to be used as raw materials. Although the intrinsic viscosity of the polyester constituting the chip is not particularly limited, the intrinsic viscosity is usually 0.50 to 1.30 dl/g.

When a raw material is melt-extruded, it is preferable to dry the polyester raw material using a dryer such as a hopper dryer and a paddle dryer, or a vacuum dryer. After the polyester raw material is dried in such a manner, utilizing an extruder, it is melted at a temperature of 200 to 300° C., and extruded into a film form. In such an extrusion, an arbitrary conventional method such as a T-die method and a tubular method can be adopted.

Then, the sheet-like molten resin after extrusion is quenched to be able to obtain an undrawn film. As a method for quenching the molten resin, a method in which a molten resin is cast on a rotary drum from a die and solidified by quenching to obtain a substantially unoriented resin sheet can be suitably adopted.

The undrawn film obtained is drawn in the longitudinal direction under a predetermined condition as described below, and the film is annealed, and then is subjecting an intermediate heat treatment, the film after the heat treatment is cooled, and then drawn in the width direction under a predetermined condition, and is subjecting an final heat treatment once again, thereby obtaining a heat-shrinkable polyester film of the present invention. Hereinafter, a preferable film forming method to obtain a heat shrinkable polyester film of the present invention is described in detail by considering the difference from the film forming method of the conventional heat-shrinkable polyester film.

As described above, generally, a heat-shrinkable polyester film can be produced by drawing an undrawn film only in a direction to be shrunk (namely, main shrinkage direction, ordinarily width direction). The present inventors have studied on the conventional production method, and as a result, it has been found that there are the following problems in production of the conventional heat-shrinkable polyester film.

In the case of using the raw material polyester that is constituted of polyesters in which the alcohol components are relatively short in length and have at most three carbon atoms and the amorphous molecular chains are made uniform in length, since the molecular orientation after drawing has a relatively simple structure, it becomes easy for the stress applied to the molecular chains to relax by aging.

Moreover, when using such polyesters in which the molecular chains are made uniform in length to some extent, the energies required for the shrinkage of respective molecular chains become roughly equivalent to one another. As a result, shrinkage force in the width direction is exhibited in one sitting at an early stage of the shrinkage of the film, there is little shrinkage stress left immediately before the end of the shrinkage, and as a result, it becomes impossible to suppress the thermal expansion of the container, and the slack of the label after being shrunk is generated.

In the case of adopting a method of drawing in the longitudinal direction after drawing in the width direction, using any drawing condition cannot sufficiently exhibit shrinkage force in the width direction. Furthermore, it exhibits shrinkage force in the longitudinal direction at the same time, so that finish property after being shrunk and attached as a label becomes bad.

In the case of adopting a method of drawing in the width direction after drawing in the longitudinal direction, although it can exhibit shrinkage force in the width direction, it exhibits shrinkage force in the longitudinal direction at the same time, so that finish property after being shrunk and attached as a label becomes bad.

However, in the case of adopting a method of drawing in the longitudinal direction, performing a heat treatment and then drawing in the width direction, since molecular chains which have been oriented by drawing immobilize the peripheral molecular chains, it is considered that relaxation of molecular chains, which may be caused by aging, is inhibited. In the case of simple drawing in the width direction, since the orientation of molecular chains is generated only in the width direction, the above-mentioned immobilizing effect is insufficient and the relaxation of molecular chains by aging is significant.

Furthermore, based on problems in the production of the above-mentioned conventional heat-shrinkable polyester film, the present inventors have conducted further studies in view of obtaining a heat shrinkable polyester film having good aging resistance and not allowing slack in a label to be generated after shrinkage, and as a result, they have arrived at the following finding.

In order to improve aging resistance, it is considered that molecular chains differing in length need to be oriented to some extent in the width direction and the longitudinal direction.

In order to reduce the generation of slack in a label with which a container is covered after shrinkage, if it is possible to suppress the reduction in shrinkage stress with time, which is generated when the film is shrunk in the width direction, by allowing molecular chains differing in length to be oriented in the width direction and the longitudinal direction, it is considered that the followability of the label can be improved.

In order to improve finish property after shrinkage-attachment as a label, it is essential not to allow the label to exhibit shrinkage force in the longitudinal direction. Therefore, it is considered that the shrinkage ability of molecules oriented in the longitudinal direction needs to be reduced.

Based on the above-mentioned findings, the present inventors have found that in order to improve aging resistance and in order to simultaneously achieve both shrinkage finish properties and followability; it is necessary to allow molecular chains differing in length to be oriented in the width direction and the longitudinal direction and to allow molecular chains not contributing to shrinkage force while being oriented in the longitudinal direction to be present in the film. Then, they have paid attention on how to carry out drawing in order for "molecules not contributed to shrinkage force while being oriented in the longitudinal direction" to be able to be present in a film and had a trial and error and to control it. As a result, they have reached the present invention based on the following: drawing is carried out in the width direction after drawing is carried out in the longitudinal direction, what is called, in production of a film by a lengthwise-transverse drawing method, by conducting the following means, "molecules not contributed to shrinkage force while being oriented in the longitudinal direction" to be present in a film can be realized, thereby to obtain a heat-shrinkable polyester film satisfying aging resistance, good finish properties after shrinkage, followability and perforation-tear property at the same time.
(1) Control of Lengthwise Drawing Condition
(2) Intermediate Heat Treatment after Lengthwise Drawing
(3) Natural Cooling between Intermediate Heat Treatment and Transverse Drawing
(4) Forced Cooling of Film after Natural Cooling
(5) Control of Transverse Drawing Condition
(6) Heat Treatment after Transverse Drawing
(7) During the Course of the Above-Mentioned Production Process, a Process in which the Film is allowed to Relax in the Longitudinal Direction is Provided.

Hereinafter, each of the procedures mentioned above will be sequentially described.

(1) Control of Lengthwise Drawing Condition

In the production of the film according to the present invention by a lengthwise-transverse drawing method, it is necessary to set the drawing temperature to a temperature of not lower than Tg and not higher than Tg+30° C. and to lengthwise drawing the film so as to allow the draw ratio to be not less than 3.0 times and not more than 4.5 times. With regard to the lengthwise drawing, either of single-stage drawing and multi-stage drawing which is two or more-stage drawing can be used.

When the total lengthwise draw ratio becomes large at the time of drawing a film of non-orientation substantially in the longitudinal direction, although there is a tendency for the shrinkage in the longitudinal direction to become large, it is possible to control the molecular orientation in the longitudinal direction by an intermediate heat treatment after lengthwise drawing and the relaxation in the longitudinal direction. However, when the lengthwise draw ratio is too large, oriented crystallization of the film after lengthwise drawing progresses and it is not preferred because breakage is easily generated at a transverse drawing process. The upper limit of the lengthwise draw ratio is more preferably not more than 4.5 times, and further preferably not more than 4.4 times. In contrast, when the lengthwise draw ratio is too small, although the shrinkage in the longitudinal direction is reduced, it is not preferred because the degree of molecular orientation in the longitudinal direction is reduced, the right angled tearing strength in the longitudinal direction is increased, and the tensile breaking strength is reduced. The lower limit of the lengthwise draw ratio is preferably 3.3 times, more preferably 3.4 times. By drawing a film in the longitudinal direction at a ratio within the above-mentioned range, the absorbancy ratio in the longitudinal direction of the film after lengthwise becomes not less than 0.40 and not more than 0.80.

In this connection, for example, Patent Document 1 discloses a film, which contains ε-caprolactone in a content of 1 to 30% by mole and neopentyl glycol in a content not less than 1% by mole and optionally contains butanediol, as a heat-shrinkable polyester film hardly causing shrinkage whitening. However, in this technique, the importance of the molecular orientation in the longitudinal direction is not taken into consideration at all, and the draw ratio in the lengthwise direction is 1.05 to 1.2 times at the largest ([0060]). Even if this technique is employed, it is impossible to obtain a heat-shrinkable polyester film in which molecules are moderately oriented in the longitudinal direction, on which point emphasis is placed in the present invention, and the lowering in performance during aging is small.

(2) Intermediate Heat Treatment after Lengthwise Drawing

In order for "molecules not contributed to shrinkage force while being oriented in the longitudinal direction" to be present in a film, it is preferable to thermally relax molecules oriented in the longitudinal direction, but conventionally in biaxial drawing of a film, between the first-axial drawing and the second axial drawing, when a film is subjected to heat treatment at high temperature, the film is crystallized after heat treatment so that the film cannot be drawn more, this fact was the technical common knowledge in the art. However, the present inventors have had a trial and error, and as a result, a surprising fact has been found out as follows; in a lengthwise-transverse drawing method, lengthwise drawing is conducted in a certain constant condition, an intermediate heat treatment is conducted in a predetermined condition with adjusting to the state of the film after the lengthwise drawing, and furthermore, with adjusting to the state of the film after the intermediate heat treatment, transverse drawing is conducted in a predetermined condition, thereby without causing breakage in the transverse drawing, to be able to make "molecules not contributed to shrinkage force while being oriented in the longitudinal direction" present in the film.

In the production of the film of the present invention by a lengthwise-transverse drawing method, after an undrawn film is lengthwisely drawn, under a state that both edges in the width direction are held by clips in a tenter, it is necessary to conduct heat treatment (hereinafter called intermediate heat treatment) at a temperature of Tg+40° C. or more and Tg+90° C. or less. When the intermediate heat treatment temperature is lower than Tg+40° C., it is not preferred because shrinkage force is left in the longitudinal direction of the film, and after transverse drawing, the shrinkage rate in the longitudinal direction of the film is heightened. Moreover, when the intermediate heat treatment temperature is higher than Tg+90° C., it is not preferred because the film surface layer is roughened and the transparency is impaired. The temperature of the intermediate heat treatment is more preferably not lower than Tg+45° C., further preferably not lower than Tg+50° C., more preferably not higher than Tg+85° C., and further preferably not higher than Tg+80° C. Moreover, it is preferred that the temperature of the intermediate heat treatment also be appropriately adjusted depending on the composition of raw materials and the draw ratio in the lengthwise direction.

By setting the temperature of the intermediate heat treatment to be not lower than Tg+40° C., the degree of molecular orientation in the longitudinal direction increased to some extent can be maintained, and therefore, it is possible to maintain the tensile breaking strength in the longitudinal direction high while maintaining the right-angled tearing strength low. In contrast, by controlling the temperature of the intermediate heat treatment within a range of not higher than Tg+90° C., it is possible to suppress the crystallization of the film to maintain the drawability in the longitudinal direction and to suppress troubles caused by breakage. Moreover, it is possible to suppress the crystallization of the surface layer of the film to maintain the solvent adhesive strength high, and furthermore, it is also possible to reduce the irregularity of thickness in the longitudinal direction. In this connection, the time for the intermediate heat treatment needs only to be appropriately adjusted within a range of not shorter than 3.0 seconds and not longer than 12.0 seconds depending on the composition of raw materials. In the intermediate heat treatment, the quantity of heat given to the film is of importance, and when the temperature of the intermediate heat treatment is low, an extended period of the intermediate heat treatment is required. However, since the facilities are made more gigantic when the treatment time for the intermediate heat treatment is too long, it is preferred to appropriately udjusttbnpruceauhytbnuzodificutiouoftbcteouperutureaodthctroatouoot time.

By performing such an intermediate heat treatment, it is possible to allow "molecules not contributed to shrinkage force while being oriented in the longitudinal direction" to be present in the film, and, since the molecular chains which have been oriented in the longitudinal direction have an action of immobilizing molecular chains in the width direction, the stress applied to molecular chains drawn particularly in the width direction is not relaxed during aging, and it is possible to obtain a film which is excellent in aging resistance and is also satisfactory in shrinkage finish properties. Even in the case where any lengthwise drawing is conducted. "molecules not contributed to shrinkage force while being oriented in the longitudinal direction" cannot be necessarily to be present in a film, but by conducting the foregoing predetermined lengthwise drawing, it becomes possible that "molecules not contributed to shrinkage force while being oriented in the longitudinal direction" can be present in a film for the first time after intermediate heat treatment. Furthermore, with the intermediate heat treatment, in the longitudinal direction of a film as the orientation direction, the oriented molecular chains are restrained by heating and the crystallization progresses, and as a result thereof, the absorbancy ratio in the longitudinal direction of the film is increased. When the orientation in the longitudinal direction of a film before the film is subjected to the intermediate heat treatment is high, the absorbancy ratio in the longitudinal direction of the film after the intermediate heat treatment is also largely increased. Moreover, the higher the temperature of the intermediate heat treatment is, the more largely increased the absorbancy ratio in the longitudinal direction of the film is since the crystallization easily progresses. On the other hand, when the relaxation in the longitudinal direction described later is performed, the absorbancy ratio is decreased since the orientation in the longitudinal direction is lowered. In this way, by adjusting the intermediate heat treatment temperature and the relaxation rate (described later) in the longitudinal direction, the absorbancy ratio in the longitudinal direction of a film after the intermediate heat treatment can be adjusted. In a preferred embodiment, when relaxation is performed after drawing in the longitudinal direction and then an intermediate heat treatment is performed at a prescribed temperature, the absorbancy ratio in the longitudinal direction of a film after the intermediate heat treatment becomes not less than 0.45 and not more than 0.80. In this connection, with regard to the width direction of the film, since the film is undrawn at the stage of the intermediate heat treatment and is not molecularly oriented, the change in the absorbancy ratio in the width direction of the film is small at the stage of the intermediate heat treatment, and the film has a small absorbancy ratio of not more than 0.3.

And then, by conducting the following prescribed natural cooling, forced cooling and transverse drawing, it is possible to orient molecules to the width direction and exhibit shrinkage force in the width direction while maintaining "molecules not contributed to shrinkage force while being oriented in the longitudinal direction" formed in the film.

(3) Natural Cooling (Shutoff of Heating) between Intermediate Heat Treatment and Transverse Drawing In production of a film by the lengthwise-transverse drawing method in the present invention, it is necessary to conduct intermediate heat treatment after lengthwise drawing, however, after the lengthwise drawing and intermediate heat treatment, the film is necessary to be passed through an intermediate zone where no heating operation is carried out actively for 0.5 seconds or more and 3.0 seconds or less. Namely, it is preferable that an intermediate zone is provided in front of a transverse drawing zone of a tenter for transverse drawing, a film after lengthwise drawing and intermediate heat treatment is introduced to the tenter and passed through the intermediate zone for a predetermined time, and then transverse drawing is carried out. In addition, in the intermediate zone, when a strip of paper is hung down without passing a film, an associated stream accompanied by movement of the film and hot air from the cooling zone are preferably shut off such that the paper strip hangs down almost completely in the vertical direction. When time for passing through the intermediate zone is less than 0.5 seconds, it is not preferable because transverse drawing becomes a high-temperature drawing, and shrinkage in the transverse direction cannot be increased sufficiently. Conversely, 3.0 seconds are sufficient time for passing through the intermediate zone, and even though setting a longer time than that, it will lead to needlessness of equipment, which is not preferable. The lower limit of the time for passing through the intermediate zone is preferably 0.7 seconds or more, and more preferably 0.9 seconds or more. Further, the upper limit of the time for passing through the intermediate zone is preferably 2.8 seconds or less, and more preferably 2.6 seconds or less.

(4) Forced Cooling of the Film after Natural Cooling

In production of a film by the lengthwise-transverse drawing method in the present invention, the film naturally cooled is not transversely drawn as it is, but it is necessary that a temperature of the film is quenched to be Tg+5° C. or more and Tg+40° C. or less. By conducting such a quenching treatment, it is possible to obtain a film having high hot-water heat shrinkage at 70° C. even after being aged. The lower limit of the temperature of the film after quenching preferably Tg+10° C. or more, more preferably Tg+15° C. or more, preferably Tg+35° C. or less, and more preferably Tg+30° C. or less.

In quenching a film, when the temperature of the film after quenching keeps exceeding Tg+40° C., shrinkage in the width direction of the film becomes low and shrinkage property becomes insufficient as a label, but by controlling the temperature of the film after quenching at Tg+40° C. or less, it becomes possible to maintain shrinkage in the width direction of the film high. Moreover, when the temperature of the film after quenching is lower than Tg+5° C., it is not preferred because the drawing stress at the time of transverse drawing is large and the film easily breaks.

(5) Control of Transverse Drawing Conditions

In production of a film by the lengthwise-transverse drawing method in the present invention, it is necessary to subject a film obtained after being subjected to longitudinal drawing, an intermediate heat treatment, natural cooling and quenching to transverse drawing under a prescribed conditions. The transverse drawing is carried out such that the ratio becomes 3 tunes or more and 6 times or less at Tg+10° C. or more and Tg+30° C. or less, in a state that both edges in the width direction are held by clips in a tenter. By conducting the transverse drawing in such predetermined conditions, it is possible to orient molecules to the width direction and to exhibit shrinkage force in the width direction while maintaining "molecules not contributed to shrinkage force while being oriented in the longitudinal direction" formed by the lengthwise drawing and the intermediate heat treatment, from which it is possible to obtain a film in which the strength in the longitudinal direction is also good. The temperature of transverse drawing is more preferably Tg+12° C. or more, further preferably Tg+14° C. or more, more preferably Tg+28° C. or less, and more preferably Tg+26° C. or less. On the other hand, the transverse drawing ratio is preferably 3.5 times or more, more preferably 3.7 times or more, preferably 5.5 times or less, and more preferably 5 times or less.

The shrinkage in the longitudinal direction is heightened and the shrinkage in the width direction is easily lowered when the drawing temperature is higher than Tg30° C. at the time of drawing a film in the transverse direction. However, it is preferred that the drawing temperature be controlled within a range of not higher than Tg+30° C. because it becomes easy to suppress the shrinkage in the longitudinal direction low and to maintain the shrinkage in the width direction high. Moreover, there is a tendency that the irregularity of thickness in the width direction is easily increased when the drawing temperature is higher than Tg+30° C. However, by controlling the drawing temperature within a range of not higher than Tg+30° C., it is possible to reduce the irregularity of thickness in the width direction.

On the other hand, the orientation in the width direction becomes too large and the film becomes easy to break at the time of transverse drawing when the drawing temperature is lower than Tg+10° C. However, by controlling the drawing temperature within a range of not lower than Tg+10° C., it is possible to reduce the breakage of a film at the time of transverse drawing.

By drawing in the width direction at the temperature and ratio mentioned above, the absorbancy ratio in the width direction of the film becomes not less than 0.40 and not more than 0.75. On the other hand, by drawing a film in the width direction, since some molecular chains which have been oriented in the longitudinal direction of the film are oriented in the width direction, the orientation in the longitudinal direction of the film is slightly lowered, and the absorbancy ratio in the longitudinal direction of the film becomes not less than 0.40 and not more than 0.75.

(6) Heat Treatment after Transverse Drawing

It is necessary that the film after transverse drawing be finally subjected to a heat treatment over a period of not shorter than 1 second and not longer than 9 seconds at a temperature of not lower than Tg° C. and not higher than Tg+50° C. in a state that both edges in the width direction are held by clips in a tenter. When the heat treatment temperature is higher than Tg+50° C., it is not preferred because the shrinkage in the width direction is lowered and the heat shrinkage at 70° C. becomes less than 30%. Moreover, when the heat treatment temperature is lower than Tg° C., it is not preferred because the film is not allowed to relax sufficiently in the width direction and the degree of shrinkage in the width direction (the so-called natural shrinkage) is increased with the lapse of time at the time of allowing a final product to be stored under ordinary temperature condition. Moreover, although it is preferred that the heat treatment time be set as long as possible, the facilities are made more gigantic when the treatment time is too long, and therefore it is preferred that the treatment time be set to not longer than 9 seconds. In this heat treatment process, although crystallization slightly occurs at a temperature of not higher than Tg+50° C. and the molecular orientation is restrained in both longitudinal and width directions of the film, absorbancy ratios hardly change, and respective absorbancy ratios in the longitudinal and width directions of the film remain not less than 0.40 and not more than 0.75.

(7) Relaxation Process in the Longitudinal Direction

As described above, in order to allow "molecules not contributed to shrinkage force while being oriented in the longitudinal direction" to be present in the film, it is preferred to allow molecules oriented in the longitudinal direction to be thermally relaxed. When the residual shrinkage stress in the longitudinal direction of the film after lengthwise drawing is increased, the film has a drawback that the shrinkage finish properties become poor since the hot-water shrinkage in the longitudinal direction of the film after transverse drawing is increased. Although performing a heat treatment in the transverse drawing process is effective to reduce the hot-water shrinkage in the longitudinal direction of the film, it cannot be said that the hot-water shrinkage in the longitudinal direction of the film is sufficiently reduced only by relaxation by heat, and a large quantity of heat is required. However, when a large quantity of heat is given to a film at the time of relaxation by heat, the film is crystallized, the drawing stress is increased at the time of drawing the film in the width direction, and there is a possibility that the film breaks at the time of transverse drawing.

As such, the present inventors have conducted studies on the procedure for reducing the molecular orientation in the longitudinal direction of the film so much that the film satisfies the right-angled tear strength and the tensile breaking strength, and controlling the difference between shrinkages and shrinkage stress in the width direction, and the right-angled tearing strength and tensile breaking strength in the longitudinal direction. And then, they have found that the above-mentioned control can be performed by performing one or more of processes shown below and relaxing the film in the longitudinal direction.

(i) A process of heating a film after lengthwise drawing at a temperature of not lower than Tg and not higher than Tg+90° C. and subjecting the film to relaxation of not less than 10% and not more than 60% in the longitudinal direction over a period of not shorter than 0.05 seconds and not longer than 5 seconds using rolls having a speed difference therebetween. As a heating means, any of a temperature conditioning roll, near infrared rays, far infrared rays, a hot air heater and the like can be used.

(ii) A process of subjecting a film to relaxation of not less than 5% and not more than 20% in the longitudinal direction over a period of not shorter than. 0.1 seconds and not longer than 12 seconds by reducing the distance between clips for grasping opposite to each other in a tenter in the intermediate heat treatment process.

(iii) A process of subjecting a film to relaxation of not less than 5% and not more than 20% in the longitudinal direction over a period of not shorter than 0.1 seconds and not longer than 9 seconds by reducing the distance between clips for grasping opposite to each other in a tenter in the final heat treatment process.

Of the above-mentioned (i) to (iii), it is most preferred that the relaxation after lengthwise drawing of (i) be performed, and (i) may be combined with (ii) or (iii). Hereinafter, each of the processes will be described.

(i) Relaxation after Lengthwise Drawing

It is desirable to heat a film after lengthwise drawing at a temperature of not lower than Tg and not higher than Tg+90° C. and subject the film to relaxation of not, less than 10% and not more than 60% in the longitudinal direction over a period of not shorter than 0.05 seconds and not longer than 5.0 seconds using rolls having a speed difference therebetween. When the temperature is lower than Tg, it is not preferred because the film after lengthwise drawing is not allowed to shrink and relaxation cannot be performed. In contrast, when the temperature is higher than Tg+90° C., it is not preferred because the film is crystallized and the transparency and the like become poor. The film temperature at the time of relaxation after lengthwise drawing is more preferably not lower than Tg+10° C. and not higher than Tg+80° C., and further preferably not lower than Tg+20° C. and not higher than Tg+70° C.

Moreover, the time for performing relaxation in the longitudinal direction of the film after lengthwise drawing is preferably not shorter than 0.05 seconds and not longer than 5 seconds. When the time is shorter than 0.05 seconds, it is not preferred because the irregularity in relaxation is generated unless the temperature is allowed to be higher than Tg+90° C. since the time for relaxation becomes short. Moreover, although the film has no problem as a film when the time for relaxation is longer than 5 seconds since relaxation can be performed at low temperatures, it is preferred to appropriately adjust the process by the modification of the temperature and the time since the facilities are made more gigantic. The relaxation time is more preferably not shorter than 0.1 seconds and not longer than 4.5 seconds, and further preferably not shorter than 0.5 seconds and not longer than 4 seconds.

Moreover, when the relaxation rate in the longitudinal direction of the film after lengthwise drawing is less than 10%, it is not preferred because relaxation of the molecular orientation in the longitudinal direction cannot be sufficiently performed, the shrinkage in the longitudinal direction is increased, and the heat shrinkage at 98° C. exceeds 15%. When the relaxation rate in the longitudinal direction of the film after lengthwise drawing is exceeds 60%, it is not preferred because the right-angled tearing strength in the longitudinal direction is increased and the tensile breaking strength in the longitudinal direction is decreased. The relaxation rate of the film after lengthwise drawing is more preferably not less than 15% and not more than 55%, and further preferably not less than 20% and not more than 50%.

Examples of a method for allowing a film after lengthwise drawing to relax include a method of heating a film after lengthwise drawing with a heating apparatus (heating furnace) arranged between rolls and performing relaxation by taking advantage of the speed difference between the rolls; a method of heating a film after lengthwise drawing with a heating apparatus (heating furnace) arranged between a roll and a transverse drawing machine and allowing the speed of the transverse drawing machine to be lower than that of the roll, and the like. As the heating apparatus (heating furnace), any of a temperature conditioning roll, a near infrared ray heater, a far infrared ray heater, a hot air heater and the like can be used.

(ii) Relaxation in the Intermediate Heat Treatment Process

In the intermediate heat treatment process, it is desirable to subject a film to relaxation of not less than 5% and not more than 20% in the longitudinal direction over a period of not shorter than 0.1 seconds and not longer than 12 seconds by reducing the distance between clips for grasping opposite to each other in a tenter. When the relaxation rate is less than 5%, it is not preferred because relaxation of the molecular orientation in the longitudinal direction cannot be sufficiently performed, the shrinkage in the longitudinal direction is increased, and the heat shrinkage at 98° C. exceeds 15%. Moreover, although the adjustment of physical properties of the film is possible when the relaxation rate is larger than 20%, the upper limit is set to 20% since the limit is 20% in view of restriction of facilities. The relaxation rate is more preferably not less than 8%, and further preferably not less than 11%.

Moreover, the time for performing relaxation in the longitudinal direction in the intermediate heat treatment process is preferably not shorter than 0.1 seconds and not longer than 12 seconds. When the time is shorter than 0.1 seconds, it is not preferred because the irregularity in relaxation is generated unless the temperature is allowed to be higher than Tg+90° C. since the time for relaxation becomes short. Moreover, although the film has no problem as a film when the relaxation time is longer than 12 seconds, it is preferred to appropriately adjust the process by the modification of the temperature and the time since the facilities are made more gigantic. The relaxation time is more preferably not shorter than 0.3 seconds and not longer than 11 seconds, and further preferably not shorter than 0.5 seconds and not longer than 1.0 seconds.

(iii) Relaxation in the Final Heat Treatment Process

In the final heat treatment process, it is desirable to subject a film to relaxation of not less than 5% and not more than 20% in the longitudinal direction over a period of not shorter than 0.1 seconds and not longer than 9 seconds by reducing the distance bet green clips for grasping opposite to each other in a tenter. When the relaxation rate is less than 5%, relaxation of the molecular orientation in the longitudinal direction cannot be sufficiently performed, the shrinkage in the longitudinal direction is increased, and the heat shrinkage at 98° C. exceeds 15%. Moreover, although the adjustment of physical properties of the film is possible when the relaxation rate is larger than 20%, the upper limit is set to 20% since the limit is 20% in view of restriction of facilities. The relaxation rate is more preferably not less than 8%, and further preferably not less than 11%.

Moreover, the time for forming relaxation in the longitudinal direction in the final heat treatment process is preferably not shorter than 0.1 seconds and not longer than 9 seconds. When the time is shorter than 0.1 seconds, it is not preferred because the irregularity in relaxation is generated unless the temperature is allowed to be higher than Tg+50° C. since the time for relaxation becomes short. Moreover, although the film has no problem as a film when the relaxation time is longer than 9 seconds, it is preferred to appropriately adjust the process by the modification of the temperature and the time since the facilities are made more gigantic. The relaxation time is more preferably not shorter than 0.3 seconds and not longer than 8 seconds, and further preferably not shorter than 0.5 seconds and not longer than 7 seconds. Since the molecular orientation in the longitudinal direction is relaxed by any relaxation among the abovementioned (i) to (iii), the absorbancy ratio is reduced. In the case where relaxation is performed after a film is drawn in the longitudinal direction as the most preferred embodiment, the absorbency ratio in the longitudinal direction of the film after the relaxation and before an intermediate heat treatment is not less than 0.30 and not more than 0.60.

4. Package

The package of the present invention is a package in which a label provided with a perforation or a notch using the foregoing, heat-shrinkable polyester film of the present invention is covered at least on a part of the outer periphery of an object to be packaged and then to shrink by heat. The object to be packaged can be exemplified by PET bottles for beverage and polyethylene-made containers used for shampoos, conditioners and the like, various kinds of bottles, cans, plastic containers for confectionary, a box lunch and the like, paper-made boxes, and the like. In general, in the case where a label using a heat-shrinkable polyester film is covered on the packaging object and heat-shrunk, the label is heat-shrunk by about 2 to 15% and closely attached on the package. Additionally, a label covered on a packaging object may be printed or may not be printed.

A method for producing a label is as follows; an organic solvent is applied on the inside slightly from the end part of one surface of a rectangular film, the film is immediately rounded to stack the end parts and bonded into a label-form, or an organic solvent is applied on the inside slightly from the end part of one surface of a film wound as a roll, the film is immediately rounded to stack the end parts and bonded into a tube-form, which is cut into a label. As the organic solvent for bonding, cyclic ethers such as 1,3-dioxolan and tetrahydrofuran are preferable. Besides, there can be used aromatic hydrocarbons such as benzene, toluene, xylene and trimethylbenzene; halogenated hydrocarbons such as methylene chloride and chloroform; phenols such as phenol, or a mixture thereof.

The present application claims the benefit of priority to Japan Patent Application Number 2013-104466 filed on May 16, 2013, and Japan Patent Application Number 2014-026788 filed on Feb. 14, 2014. The entire contents of the specifications of Japan Patent Application Number 2013-104466 filed on May 16, 2013, and Japan Patent Application Number 2014-026788 filed on Feb. 14, 2014 are hereby incorporated by reference.

EXAMPLES

Hereinafter, the present invention is described in more detail by Examples, but the present invention is by no means limited to aspects of the Examples, and it can be suitably modified in the range not departing from the scope of the present invention. Evaluation methods of polyesters and films using in the present invention are as follows.

[Tg]

Using a differential scanning calorimeter manufactured by Seiko Instruments Inc. (model: DSC220), 10 mg of an undrawn film was heated at a heating up speed of 10° C./min from −40° C. to 120° C., Tg was obtained from the thus obtained endothermic curve. Tangent lines were drawn in front of and behind the inflection point of the endothermic curve, and the intersection was defined as glass transition point (Tg; ° C.).

[Shrinkage Stress]

A sample of 200 mm in length in the main shrinkage direction and 20 mm in width was cut out of a heat-shrinkable film which is not placed under aging environment (hereinafter, unless otherwise noted, merely the term heat-shrinkable film is meant to refer to heat-shrinkable film not under aging environment), and measured for the shrinkage stress using a strength and elongation measuring machine with a heating furnace (TENSILON (a registered trademark of ORIENTEC Co., LTD)). The heating furnace was previously heated to 90° C., and the distance between chucks was set to 1.00 mm. The air blast blown into the heating furnace was once stopped, the door of the heating furnace was opened, the sample was fitted to the chucks, after which the door of the heating furnace was quickly closed and the air blast was restarted. The shrinkage stress was measured over a period of not shorter than 30 seconds, a shrinkage stress (MPa) at the end of 30 seconds was determined, and the maximum value obtained during the measurement was defined as the maximum shrinkage stress (MPa). Moreover, the ratio (percentage) of a shrinkage stress at the end of 30 seconds relative to the maximum shrinkage stress was defined as the stress ratio (%).

[Absorbancy Ratio]

Using an FT-IR spectrometer "FTS 60A/896" (manufactured by Varian Inc.), the infrared absorption spectrum of a heat-shrinkable film was measured by ATR method utilizing polarized light under the conditions of a measuring wave number region of 650 to 4000 $cm^{-1}$ and a cumulative number of 128 times. A ratio A1/A2 of an absorbancy A1 at 1340 $cm^{-1}$ to an absorbancy A2 at 1410 $cm^{-1}$ is defined as the absorbancy ratio.

[Heat Shrinkage (Hot-Water Heat Shrinkage)]

A heat-shrinkable film or a film after aged for 672 hours in an atmosphere of 30° C. and 85% RH was cut into a square of 10 cm×10 cm, treated and heat-shrunk in no load state for 10 seconds in hot water at a predetermined temperature ±0.5° C., and then the dimensions of the film in the lengthwise and transverse directions were measured, and heat shrinkage each was obtained according to the following Equation 1. The direction with the larger heat shrinkage was defined as a main shrinkage direction.

Heat shrinkage={(length before shrinkage−length after shrinkage)/length before shrinkage}×100 (%)   Equation 1

[Enthalpy Relaxation Amount]

A 4.0-mg portion of a film sample after aged for 672 hours in an atmosphere of 30° C. and 85% RH was weighed into a hermetic aluminum pan. The peak area of the enthalpy relaxation part around the glass transition point of the non-reverse heat flow obtained by measuring the film sample under the conditions of the MDSC (registered trademark) heat only mode, an average heating rate of 2.0° C./min and a modulation cycle of 50 seconds using a temperature modulated differential scanning calorimeter (DSC) "Q100" (manufactured by TA Instruments Japan Inc.) was defined as the enthalpy relaxation amount (J/g).

Moreover, in the reverse heat flow obtained b measuring the film sample in the same manner as that in the non-reverse heat flow, since the baseline shift around the Tg had appeared without turbulence, it was confirmed that the measurement for the non-reverse heat flow was also normally performed.

[Natural Shrinkage]

A film sample out into a square of 200 mm×200 mm was allowed to stand for 672 hours in an atmosphere of 40° C. and 65% RH to perform aging. The natural shrinkage (in the main shrinkage direction) was determined by the following Equation 2.

Natural shrinkage={(length before aging−length after aging)/length before aging}×100(%)   Equation 2

[Tensile Breaking Strength]

In accordance with JIS K7113, a test specimen with a strip-like shape of 140 mm in the measurement direction (the longitudinal direction of the film) and 20 mm in the direction orthogonal to the measurement direction (the width direction of the film) was prepared. Using a universal tensile testing machine "DSS-100" (manufactured by SHIMADZU CORPORATION), each of 20 mm grasping margins located at both ends of the test specimen was fixed to a chuck (the distance between chucks of 100 mm), the tensile test was performed under the conditions of an atmospheric temperature of 23° C. and a tensile speed of 200 mm/minute, and the strength (stress) at the time of being torn and broken was defined as the tensile breaking strength.

[Right-Angled Tearing Strength]

A film in a state of being previously slackened was mounted to a rectangular frame having a prescribed length (that is, both ends of the film were allowed to be grasped by the frame). Then, by immersing the film in hot water at 80°

C. for about 5 seconds until the slackened film became a tensioned state within the frame (until the slack was eliminated), the film was allowed to shrink by 10% in the width direction. In accordance with JIS K7128-3, a test specimen with a shape shown in FIG. 1 was cut out of this film which had been allowed to shrink by 10%. In this connection, at the time of cutting out the test specimen, the longitudinal direction of the film was directed along the tearing direction. Next, both ends (in the width direction) of the test specimen was allowed to be grasped with a universal tensile testing machine ("Autograph" manufactured by SHIMADZU CORPORATION), the tensile test was performed under the condition of a tensile speed of 200 mm/minute, and a maximum load at the time of being completely torn apart in the longitudinal direction of the film was measured. By dividing the maximum load by the thickness of the film, a right-angled tearing strength per unit thickness (N/mm) was calculated.

[Slack of Label After Shrinkage (Before Aging)]

By bonding both end parts of a heat-shrinkable film with dioxolane, a cylindrical label (a label in which the main shrinkage direction of a heat shrinkable film was set to the circumferential direction) was prepared. A polyethylene-made container (trunk diameter 160 mm, minimum diameter of neck part 70 mm) was covered with this label, and a hot air of 120° C. (wind speed 12 m/second) was blown to the label for 60 seconds to shrink the label by heat, whereby the label was attached to the container. The label-attached container was cooled to room temperature, after which, with regard to slack generated between the container and the label, the label-attached container was evaluated for the feeling obtained when the label was rotated by hand according to the following criteria.

3: There is no slack between the attached label and the container, and the label does not move when the cap portion of the container is fixed by hand and the label is made to rotate.

2: The label does not move when the cap portion of the container is fixed by hand and the label is made to rotate, but there is a little slack between the label and the container.

1: The label moves when the cap portion of the container is fixed by hand and the label is rotated.

[Shrinkage Finish Property After Aging]

On a heat-shrinkable film after aging, a color-printing with gold ink was provided. By bonding both end parts of the printed film with dioxolan, a cylindrical-form label (a label in which the main shrinkage direction of a heat-shrinkable film was set to the circumferential direction) was produced. The label was allowed to stand for 672 hours in an atmosphere of 30° C. and 85% RH to perform aging. Then, the temperature of a polyethylene-made container described above was adjusted to 60° C., the container was covered with the label, and a hot air of 120° C. (wind speed 12 m/second) was blown to the label for 60 seconds to shrink the label by heat. The shrinkage finish properties of the label were visually evaluated in 5 grades according to the following criteria.

5: The finish properties are most satisfactory (There is no defect.)

4: The finish properties are satisfactory. (There is a defect at one location.)

3: There are defects at 2 locations.

2: There are defects at 3 to 5 locations.

1: There are many defects (at 6 or more locations).

In this connection, the defect refers to jumping, wrinkles, insufficient shrinkage, a folded label end part, shrinkage whitening, or the like.

[Perforation Opening Property]

A label to which perforations were previously provided in the direction orthogonal to the main shrinkage direction was attached on a polyethylene-made container described above in the same condition as in the foregoing measuring condition of shrinkage finish property. The perforation was formed by providing a hole of 1 mm long in the intervals of 1 mm, and two lines of perforations were provided in width 22 mm and length 120 mm in the lengthwise direction of the label (height direction). Thereafter, this bottle was filled with 500 ml of water, cooled at 5° C., and perforations of the label of the bottle immediately after taking it out from a refrigerator were torn with fingertips, and the number of bottles cleanly not torn along the perforations in the lengthwise direction thereby to be not able to remove the label from the bottle was counted, the total samples of 50 minus the above number of bottles, and a ratio (%) relative to the total samples of 50 was calculated as a perforation opening defective ratio.

[Haze]

In accordance with JIES K7136, haze was measured by using a haze meter (500 A, manufactured by Nippon Denshoku Industries Co., Ltd.). The measurement was carried out twice and the average was obtained.

<Preparation of Polyester Raw Material>

Synthetic Example 1

Into an autoclave made of stainless steel equipped with a stirrer, a thermometer and a partial reflux condenser, 100 mol % of dimethyl terephthalate (DMT) as a dicarboxylic acid component and 100 mol % of ethylene glycol (EG) as a glycol component were charged such that ethylene glycol became 2.2 times to dimethyl terephthalate in mole ratio, and using 0.05 mol % (relative to acid component) of zinc acetate as an ester exchange catalyst, and 0.225 mol % (relative to acid component) of antimony trioxide as a polycondensation catalyst, ester exchange reaction was conducted while distilling methanol generated out of the system. Thereafter, polycondensation reaction was carried out at 280° C. under a reduced pressure of 26.7 Pa. A polyester (A) of 0.75 dl/g in intrinsic viscosity was obtained. Composition is shown in Table 1.

Synthetic Example 2-7

In the same way as Synthetic Example 1, polyesters B to G shown in Table 1 were synthesized. In the production of polyester F, $SiO_2$ (Silysia 266 manufactured by Fuji Silysia Chemical, Ltd.; average particle diameter 1.5 μm) was added as a lubricant at a proportion of 7,000 ppm relative to the polyester. In the Table, IPA is isophthalic acid, NPG is neopentyl glycol, CHDM is 1,4-cyclohexanedimethanol, BD is 1,4-butanediol, and ε-CL is ε-caprolactone. Regarding the intrinsic viscosity of each polyester, B was 0.72 dl/g, C was 0.80 dl/g, D was 1.20 dl/g, E was 0.77 dl/g, F was 0.75 dl/g and G was 0.78 dl/g. Each polyester was suitably made into chips.

TABLE 1

| Polyester raw material | Raw material composition of polyester (mol %) | | | | | | | | Added mount of lubricant (ppm) |
|---|---|---|---|---|---|---|---|---|---|
| | Acid component | | Polyhydric alcohol component | | | | | Ester component | |
| | TPA | IPA | EG | BD | NPG | CHDM | DEG | ε-CL | |
| A | 100 | 0 | 99 | — | — | — | 1 | — | |
| B | 100 | 0 | 68 | — | 30 | — | 2 | — | |
| C | 100 | 0 | 67 | — | — | 30 | 3 | — | |
| D | 100 | 0 | — | 100 | — | — | — | — | |
| E | 100 | 0 | — | 55 | — | — | — | 45 | |
| F | 100 | 0 | 99 | — | — | — | 1 | — | 7000 |
| G | 80 | 20 | 85 | 0 | 14 | 0 | 1 | — | |

Example 1

The above-described polyester A, polyester B, polyester E and polyester F were mixed by 5:75:15:5 in mass ratio, and charged into an extruder. Thereafter, the mixed resin was melted at 280° C. and extruded from a T-die, and quenched by winding it on a rotating metal roll set at a surface temperature of 30° C. An undrawn film of 400 μm thickness was obtained. Tg of the undrawn film was 60° C.

The obtained undrawn film was introduced to a lengthwise drawing machine in which a plurality of rolls were continuously disposed, and preheated until the film temperature reached 80° C. by a preheat roll. After which, the film was drawn by 4.1 times in the lengthwise direction by using the rotating speed difference between a low-speed rotating roll whose surface temperature was set to 86° C. and a high-speed rotating roll whose surface temperature was set to 86° C.

The film immediately after the lengthwise drawing was passed through a heating furnace. The inside of the heating furnace was heated by means of a hot-air heater, and the preset temperature was set to 95° C. By taking advantage of the speed difference between a roll at the inlet side and a roll at the outlet side of the heating furnace, the film was allowed to relax by 45% in the longitudinal direction. The time for relaxation was set to 0.6 seconds.

The film after the relaxation treatment was introduced to a transverse drawing machine (tenter) and subjected to an intermediate heat treatment at 123° C. The film after the intermediate heat treatment was introduced to the first intermediate zone and subjected to natural cooling by passing it through the zone over a period of 1.0 second. In the first intermediate zone in the tenter, hot wind from the intermediate heat treatment zone and cooling wind from the cooling zone were shut off such that when a rectangular strip of paper is hung down in the vertical direction in a state that a film is not passed through, the strip of paper hangs down almost completely in the vertical direction. In addition, when a film passes through, the distance of the film and the shielding plate was adjusted such that the most part of associated air accompanied by movement of the film was shut off by the shielding plate provided between the first intermediate heat treatment zone and the intermediate zone.

Thereafter, the film after the natural cooling was introduced to the cooling zone, and actively cooled by blowing wind of low temperature until the surface temperature of the film became 87° C. This film was subjected to natural cooling again by passing it through the second intermediate zone over a period of 1.0 second. Then the film was preheated in the transverse drawing zone until the film surface temperature reached 86° C., and then drawn by 4.0 times in the width direction (transverse direction) at 86° C.

The film after transverse drawing was introduced into a final heat treatment zone, and subjected to a heat treatment at 86° C. in the final heat treatment zone. Afterward, the film was cooled, both edge parts thereof were cut away, and the film of 500 mm in width was wound into a roll to continuously produce a biaxially drawn film with a thickness of 40 μm of a prescribed length. In this connection, in this example, the relaxation rates at the time of the intermediate heat treatment and the final heat treatment were set to 0%. The resulting film was evaluated for various properties in the above-mentioned manner. The production conditions are shown in Table 2 and the evaluation results are shown in Table 3. The film was satisfactory in cutting property and shrinkage finish properties. Moreover, the shrinkage stress curve was shown in FIG. 2. Moreover, the shrinkage stress curve is shown in FIG. 2 and the temperature modulated DSC measurement results are shown in FIG. 3. In FIG. 3, the chart with no mark shows the result of the non-reverse heat flow in Example 1 and the chart with an outlined square shows the result of the reverse heat flow in Example 1. A clear endothermic peak is observed in the non-reverse heat flow, and this reveals that the enthalpy relaxation is performed. In this connection, since the baseline is shifted around the Tg in the reverse heat flow, it was confirmed that the measurement for DSC was normally performed.

Example 2

The same polyester raw material as that in Example 1 was melt-extruded in the same manner as that in Example 1 and drawn to the lengthwise direction in the same manner as that in Example 1. Then, the film was subjected to a 15% relaxation treatment in the longitudinal direction of the film in a heating furnace at 95° C. Thereafter, the natural cooling, the forced cooling, the transverse drawing and the final heat treatment were performed in the same manner as that in Example 1 except that the intermediate heat treatment was performed at 140° C., and in the final heat treatment process, the film was subjected to a 5% relaxation treatment in the longitudinal direction of the film at 86° C. Accordingly, the sum of relaxation rates in the longitudinal direction of the film was 20%. A biaxially drawn film with a width of 500 mm and a thickness of 40 μm was obtained. The production conditions are shown in Table 2 and the evaluation results are shown in Table 3.

Example 3

The same polyester raw material as that in Example 1 was melt-extruded in the same manner as that in Example 1 and drawn in the lengthwise direction in the same manner as that in Example 1. Then, the film was subjected to a 50% relaxation treatment in the longitudinal direction of the film in a heating furnace at 95° C. Thereafter, the natural cooling, the forced cooling, the transverse drawing and the final heat treatment were performed in the same manner as that in Example 1 except that a 20% relaxation treatment was performed. Accordingly the sum of relaxation rates in the longitudinal direction of the film was 60%. A biaxially drawn film with a width of 500 mm and a thickness of 40 μm was obtained. The production conditions are shown in Table 2 and the evaluation results are shown in Table 3.

Example 4

The same polyester raw material as that in Example 1 was melt-extruded in the same manner as that in Example 1 and drawn in the lengthwise direction in the same manner as that in Example 1. Then, a biaxially drawn film with a width of 500 mm and a thickness of 40 μm was produced continuously in the same manner as that in Example 1 except that the intermediate heat treatment was performed at 140° C., and the final heat treatment was performed at 90° C. The production conditions are shown in Table 2 and the evaluation results are shown in Table 3.

Example 5

Polyester B, polyester E and polyester F were mixed by 65:30:5 in mass ratio, and charged into an extruder. Thereafter, the mixed resin was melt-extruded in the same conditions in Example 1. An undrawn film was obtained. Tg of the undrawn film was 55° C. A biaxially drawn film with a width of 500 mm and a thickness of 40 μm was produced continuously using the undrawn film, in the same manner as that in Example 1 except that the film temperature at the lengthwise drawing was set to 80° C., the intermediate heat treatment was performed at 140° C., and the film temperature at the zone transverse drawing was set to 83° C. The production conditions are shown in Table 2 and the evaluation results are shown in Table 3.

Example 6

Polyester A, polyester C, polyester E and polyester F were mixed by 18:62:15:5 in mass ratio, and charged into an extruder. Thereafter, the mixed resin was melt-extruded in the same conditions in Example 1. An undrawn film with a thickness of 400 μm was obtained. Tg of the undrawn film was 61° C. A biaxially drawn film with a width of 500 mm and a thickness of 40 μm was produced continuously using the undrawn film, in the same manner as that in Example 1 except that the intermediate heat treatment was performed at 140° C. The production conditions are shown in Table 2 and the evaluation results are shown in Table 3.

Example 7

A biaxially drawn film with a width of 500 mm and a thickness of 40 μm was produced continuously, in the same manner as that in Example 1 except that polyester A, polyester C, polyester E and polyester F were mixed by 5:80:10:5 in mass ratio, and the intermediate heat treatment was performed at 140° C. Tg of the undrawn film was 61° C. The production conditions are shown in Table 2 and the evaluation results are shown in Table 3.

Example 8

A biaxially drawn film with a width of 500 mm and a thickness of 40 μm was produced continuously, in the same manner as that in Example 1 except that polyester A, polyester C, polyester E and polyester F were mixed by 5:15:5:75 in mass ratio. Tg of the undrawn film was 59° C. The production conditions are shown in Table 2 and the evaluation results are shown in Table 3.

Example 9

The same polyester raw material as that in Example 1 was melt-extruded in the same manner as that in Example 1, drawn in the lengthwise direction and performed relaxation treatment in the same manner as that in Example 1. Then, the film after relaxation, treatment and lengthwise drawing was drawn in the transverse direction in the same manner as that in Example 1 except that the drawing ratio of the transverse drawing was changed to 3.0 times, the temperature of the transverse drawing was changed to 90° C., and the temperature of the final heat treatment was changed to 90° C. A biaxially drawn film with a width of 500 mm and a thickness of 40 μm was produced continuously. The production conditions are shown in Table 2 and the evaluation results are shown in Table 3.

Example 10

The same polyester raw material as that in Example 1 was melt-extruded in the same manner as that in Example 1, drawn in the lengthwise direction and performed relaxation treatment in the same manner as that in Example 1 except that the drawing ratio of the lengthwise drawing was changed to 3.5 times. Then, the film after relaxation treatment and lengthwise drawing was drawn in the transverse direction in the same manner except that the temperature of the transverse drawing and final heat treatment was changed to 83° C. A biaxially drawn film with a width of 500 mm and a thickness of 40 μm was produced continuously. The production conditions are shown in Table 2 and the evaluation results are shown in Table 3.

Comparative Example 1

When the same polyester raw material as that in Example 6 was melt-extruded in the same manner as that in Example 6, the discharge amount of the extruder was adjusted so that the thickness of an undrawn film became 180 μm. Other than that, in the same manner as that in Example 6, an undrawn film was obtained. Then, the film was not subjected to longitudinal drawing, and was preheated to 76° C. in a tenter, after which the film was drawn by 4.0 times at 67° C., subjected to a final heat treatment at 76° C., and then cooled. Both edge parts thereof were cut away, and the film of 500 mm in width was wound into a roll to continuously produce a uniaxially drawn film with a thickness of 40 μm of a prescribed length. The production conditions are shown in Table 2 and the evaluation results are shown in Table 3. Moreover, the shrinkage stress curve is shown in FIG. 2.

Comparative Example 2

An undrawn film was produced in the same manner as that in Example 1 except that polyester A, polyester B, polyester D and polyester F were mixed by 10:75:10:5 in mass ratio. A biaxially drawn film with a width of 500 mm and a thickness of 40 µm was produced continuously, in the same manner as that in Example 1 except that the temperature of the relaxation treatment after the lengthwise drawing was changed to 105° C., the relaxation rate was changed to 40%, the temperature of the intermediate heat treatment was changed to 130° C., the film surface temperature after cooling was changed to 103° C., the temperature of the transverse drawing was changed to 100° C. and the temperature of the final heat treatment was changed to 95° C. Tg of the undrawn film was 70° C. The production conditions are shown in Table 2 and the evaluation results are shown in Table 3.

Comparative Example 3

An undrawn film was obtained by using the same raw material as that in Comparative Example 2, in the same manner as that in Comparative Example 2. A biaxially drawn film with a width of 500 mm and a thickness of 40 µm was produced continuously, in the same manner as that in Comparative Example 2 except that the film surface temperature after cooling was changed to 95° C., the temperature of the transverse drawing was changed to 90° C. and the temperature of the final heat treatment was changed to 101° C. The production conditions are shown in Table 2, the evaluation results are shown in Table 3, and the temperature modulated DSC measurement results are shown in FIG. 3. In FIG. 3, the chart with an outlined circle shows the result of the non-reverse heat flow in Example 1 and the chart with an outlined triangle shows the result of the reverse heat flow. A clear endothermic peak is observed in the non-reverse heat flow, and this reveals that the enthalpy relaxation is performed and that the area is larger than that of the endothermic peak in Example 1 (the enthalpy relaxation amount is large). In the measurement for Comparative Example 3, since the baseline of the reverse heat flow is also shifted around the Tg, it was confirmed that the measurement for DSC was normally performed.

Comparative Example 4

An undrawn film was obtained by using the same raw material as that in Comparative Example 2, in the same manner as that in Comparative Example 2, Then, a biaxially drawn film with a width of 500 mm and a thickness of 40 µm was produced continuously in the same manner as that in Comparative Example 2 except that the relaxation rate in the film longitudinal direction was changed 0%. The production conditions are shown in Table 2, the evaluation results are shown in Table 3.

TABLE 2

| | | Example 1 | Example 2 | Example 3 | Example 4 | Example 5 | Example 6 | Example 7 | Example 8 |
|---|---|---|---|---|---|---|---|---|---|
| Raw material composition of film (mass %) | Polyester A | 5 | 5 | 5 | 5 | — | — | 5 | 5 |
| | Polyester B | 75 | 75 | 75 | 75 | 65 | 18 | — | — |
| | Polyester C | — | — | — | — | — | 62 | 80 | — |
| | Polyester D | — | — | — | — | — | — | — | — |
| | Polyester E | 15 | 15 | 15 | 15 | 30 | 15 | 10 | 15 |
| | Polyester F | 5 | 5 | 5 | 5 | 5 | 5 | 5 | 5 |
| | Polyester G | 0 | 0 | 0 | 0 | 0 | 0 | 0 | 75 |
| Amount of amorphous component (mol %) | | 22.0 | 22.0 | 22.0 | 22.0 | 18.6 | 23.3 | 23.5 | 26.7 |
| Amount of butanediol (mol %) | | 9.5 | 9.5 | 9.5 | 9.5 | 21.4 | 9.9 | 6.4 | 8.3 |
| Amount of ε-caprolactone (mol %) | | 7.8 | 7.8 | 7.8 | 7.8 | 18.3 | 8.1 | 5.2 | 6.8 |
| Amount of ethylene glycol monomer (mol %) | | 59.7 | 59.7 | 59.7 | 59.7 | 46.8 | 56.8 | 63.6 | 74.3 |
| Grass transition temperature Tg (° C.) | | 60 | 60 | 60 | 60 | 55 | 61 | 61 | 59 |
| Lubricant | Average particle diameter (µm) | 1.5 | 1.5 | 1.5 | 1.5 | 1.5 | 1.5 | 1.5 | 1.5 |
| | Added amount (mass %) | 0.042 | 0.042 | 0.042 | 0.042 | 0.042 | 0.042 | 0.042 | 0.042 |
| Lengthwise drawing | Drawing temperature (° C.) | 86 | 86 | 86 | 86 | 80 | 86 | 86 | 86 |
| | Drawing ratio | 4.1 | 4.1 | 4.1 | 4.1 | 4.1 | 4.1 | 4.1 | 4.1 |
| Relaxation after lengthwise drawing | Temperature of furnace (° C.) | 95 | 95 | 95 | 95 | 95 | 95 | 95 | 95 |
| | Relaxation ratio (%) | 45 | 15 | 50 | 45 | 45 | 45 | 45 | 45 |
| Transverse drawing | Intermediate heat treatment (preheating) | Temperature (° C.) | 123 | 140 | 123 | 140 | 140 | 140 | 140 | 123 |
| | | Relaxation ratio (%) | 0 | 0 | 20 | 0 | 0 | 0 | 0 | 0 |
| | Cooling zone | Temperature (° C.) | 87 | 87 | 87 | 87 | 87 | 87 | 87 | 87 |
| | Drawing zone | Temperature | 86 | 86 | 86 | 86 | 83 | 86 | 86 | 86 |
| | | Ratio | 4.0 | 4.0 | 4.0 | 4.0 | 4.0 | 4.0 | 4.0 | 4.0 |
| | Final heat treatment | Temperature | 86 | 86 | 86 | 90 | 86 | 86 | 86 | 86 |
| | | Relaxation ratio (%) | 0 | 5 | 0 | 0 | 0 | 0 | 0 | 0 |

| | | Example 9 | Example 10 | Comparative Example 1 | Comparative Example 2 | Comparative Example 3 | Comparative Example 4 |
|---|---|---|---|---|---|---|---|
| Raw material composition of film (mass %) | Polyester A | 5 | 5 | — | 10 | 10 | 10 |
| | Polyester B | 75 | 75 | 18 | 75 | 75 | 75 |
| | Polyester C | — | — | 62 | — | — | — |
| | Polyester D | — | — | — | 10 | 10 | 10 |
| | Polyester E | 15 | 15 | 15 | — | — | — |
| | Polyester F | 5 | 5 | 5 | 5 | 5 | 5 |
| | Polyester G | 0 | 0 | 0 | 0 | 0 | 0 |

TABLE 2-continued

|  |  |  |  |  |  |  |  |
|---|---|---|---|---|---|---|---|
| Amount of amorphous component (mol %) |  |  | 22.0 | 22.0 | 23.2 | 22.7 | 22.7 | 22.7 |
| Amount of butanediol (mol %) |  |  | 9.5 | 9.5 | 9.9 | 9.4 | 9.4 | 9.4 |
| Amount of ε-caprolactone (mol %) |  |  | 7.8 | 7.8 | 8.1 | 0.0 | 0.0 | 0.0 |
| Amount of ethylene glycol monomer (mol %) |  |  | 59.7 | 59.7 | 56.8 | 66.9 | 66.9 | 66.9 |
| Grass transition temperature Tg (° C.) |  |  | 60 | 60 | 61 | 70 | 70 | 70 |
| Lubricant | Average particle diameter (μm) |  | 1.5 | 1.5 | 1.5 | 1.5 | 1.5 | 1.5 |
|  | Added amount (mass %) |  | 0.042 | 0.042 | 0.042 | 0.042 | 0.042 | 0.042 |
| Lengthwise drawing | Drawing temperature (° C.) |  | 86 | 86 | — | 86 | 86 | 86 |
|  | Drawing ratio |  | 4.1 | 3.5 | — | 4.1 | 4.1 | 4.1 |
| Relaxation after lengthwise drawing | Temperature of furnace (° C.) |  | 95 | 95 | — | 105 | 105 | 105 |
|  | Relaxation ratio (%) |  | 45 | 45 | — | 40 | 40 | 0 |
| Transverse drawing | Intermediate heat treatment (preheating) | Temperature (° C.) | 123 | 123 | 76 | 130 | 130 | 130 |
|  |  | Relaxation ratio (%) | 0 | 0 | 0 | 0 | 0 | 0 |
|  | Cooling zone | Temperature (° C.) | 87 | 87 | — | 103 | 95 | 103 |
|  | Drawing zone | Temperature | 90 | 83 | 67 | 100 | 90 | 100 |
|  |  | Ratio | 3.0 | 3.0 | 4.0 | 4.0 | 4.1 | 4.0 |
|  | Final heat treatment | Temperature | 90 | 83 | 76 | 95 | 101 | 95 |
|  |  | Relaxation ratio (%) | 0 | 0 | 0 | 0 | 0 | 0 |

TABLE 3

|  |  |  | Example 1 | Example 2 | Example 3 | Example 4 | Example 5 | Example 6 | Example 7 | Example 8 |
|---|---|---|---|---|---|---|---|---|---|---|
| Heat shrinkage stress | 90° C. Maximum (MPa) | Width direction | 10.1 | 13.9 | 8.9 | 8.2 | 6.5 | 9.3 | 9.3 | 9.9 |
|  | After 30 sec. (MPa) | Width direction | 9.0 | 10.8 | 8.2 | 7.5 | 5.7 | 8.3 | 8.1 | 8.4 |
|  | Stress ratio | Width direction | 89.1 | 77.7 | 92.1 | 91.5 | 87.7 | 89.2 | 87.1 | 84.8 |
| Hat-water shrinkage at 70° C. |  | Width direction | 43.0 | 44.5 | 42.9 | 35.2 | 51.2 | 44.0 | 41.3 | 39.3 |
| Hot-water shrinkage at 98° C. |  | Width direction | 68.2 | 69.0 | 68.5 | 67.9 | 63.7 | 70.2 | 69.6 | 69.1 |
| Hot-water shrinkage at 98° C. |  | Longitudinal direction | 9.8 | 13.2 | 8.3 | 8.3 | 5.3 | 9.9 | 9.8 | 10.5 |
| Slack of label after shrinkage |  |  | 3 | 3 | 2 | 3 | 2 | 3 | 3 | 3 |
| Absorbancy ratio |  | Longitudinal direction | 0.59 | 0.70 | 0.55 | 0.59 | 0.51 | 0.58 | 0.64 | 0.57 |
|  |  | Width direction | 0.62 | 0.70 | 0.61 | 0.63 | 0.53 | 0.62 | 0.65 | 0.60 |
| Difference between absorbancy ratio of width direction and absorbancy ratio of longitudinal direction |  |  | 0.03 | 0.00 | 0.06 | 0.04 | 0.02 | 0.04 | 0.01 | 0.03 |
| Hot-water shrinkage at 70° C. after aging |  | Width direction | 41.3 | 42.5 | 41.0 | 33.8 | 49.3 | 43.2 | 38.2 | 34.2 |
| Enthalpy relaxation amount before aging (J/g) |  |  | 0.1 | 0.1 | 0.1 | 0.0 | 0.1 | 0.0 | 0.1 | 0.1 |
| Enthalpy relaxation amount after aging (J/g) |  |  | 2.6 | 2.3 | 2.2 | 1.8 | 2.3 | 1.1 | 3.5 | 3.8 |
| Natural shrinkage after aging (%) |  | Width direction | 1.1 | 1.3 | 1.1 | 1.0 | 1.1 | 0.5 | 1.7 | 0.7 |
| Shrinkage finish property after aging |  |  | 5 | 4 | 5 | 4 | 4 | 5 | 4 | 5 |
| Tensile breaking strength (MPa) |  | Longitudinal direction | 107 | 170 | 91 | 110 | 85 | 110 | 122 | 92 |
| Right-angled tearing strength (N/mm) |  | Longitudinal direction | 280 | 210 | 300 | 275 | 315 | 270 | 270 | 290 |
| Perforation opening defective ratio (%) |  |  | 12 | 9 | 20 | 12 | 20 | 13 | 13 | 13 |
| Haze (%) |  |  | 4.6 | 5.3 | 4.4 | 5.3 | 5.3 | 5.7 | 5.2 | 5.5 |

TABLE 3-continued

|  |  |  | Example 9 | Example 10 | Comparative Example 1 | Comparative Example 2 | Comparative Example 3 | Comparative Example 4 |
|---|---|---|---|---|---|---|---|---|
| Heat shrinkage stress | 90° C. Maximum (MPa) | Width direction | 7.9 | 7.1 | 5.2 | 9.6 | 15.3 | 14.3 |
|  | After 30 sec. (MPa) | Width direction | 6.4 | 5.4 | 3.2 | 8.2 | 12.2 | 10.9 |
|  | Stress ratio | Width direction | 81.0 | 76.1 | 61.5 | 85.4 | 79.7 | 76.2 |
| Hat-water shrinkage at 70° C. |  | Width direction | 34.6 | 33.4 | 44.0 | 13.8 | 28.3 | 18.7 |
| Hot-water shrinkage at 98° C. |  | Width direction | 57.4 | 55.1 | 74.0 | 56.4 | 64.2 | 57.5 |
| Hot-water shrinkage at 98° C. |  | Longitudinal direction | 8.9 | 6.2 | 7.6 | 9.6 | 10.3 | 46.4 |
| Slack of label after shrinkage |  |  | 3 | 3 | 1 | 1 | 2 | 2 |
| Absorbancy ratio |  | Longitudinal direction | 0.52 | 0.41 | 0.15 | 0.58 | 0.63 | 0.78 |
|  |  | Width direction | 0.43 | 0.42 | 0.70 | 0.81 | 0.89 | 0.83 |
| Difference between absorbancy ratio of width direction and absorbancy ratio of longitudinal direction |  |  | 0.09 | 0.01 | 0.55 | 0.23 | 0.26 | 0.05 |
| Hot-water shrinkage at 70° C. after aging |  | Width direction | 32.2 | 30.5 | 42.2 | 11.7 | 22.0 | 12.1 |
| Enthalpy relaxation amount before aging (J/g) |  |  | 0.0 | 0.0 | 0.0 | 0.0 | 0.1 | 0.1 |
| Enthalpy relaxation amount after aging (J/g) |  |  | 2.8 | 3.1 | 1.8 | 2.0 | 4.3 | 3.6 |
| Natural shrinkage after aging (%) |  | Width direction | 0.9 | 0.8 | 0.6 | 0.4 | 2.4 | 1.2 |
| Shrinkage finish property after aging |  |  | 4 | 4 | 4 | 1 | 1 | 1 |
| Tensile breaking strength (MPa) |  | Longitudinal direction | 95 | 82 | 53 | 134 | 142 | 246 |
| Right-angled tearing strength (N/mm) |  | Longitudinal direction | 280 | 320 | 440 | 230 | 230 | 180 |
| Perforation opening defective ratio (%) |  |  | 12 | 20 | 45 | 11 | 10 | 5 |
| Haze (%) |  |  | 4.2 | 4.0 | 5.6 | 5.1 | 5.4 | 6.9 |

With regard to the heat-shrinkable film in the example of the present invention, prescribed amounts of butanediol and ε-caprolactone are used, the film is biaxially drawn films after being subjected to a prescribed relaxation process, there is no slack in a label, there is little deterioration in heat shrinkage properties during aging, and furthermore, the film is excellent in shrinkage finish properties of a label after aging.

In Comparative Example 1, since the film was not subjected to lengthwise drawing, the shrinkage stress at 90° C. was decreased to 61.5% after 30 seconds, and the slack of a label was observed. Moreover, since the molecular chains are not oriented in the longitudinal direction, the absorbancy ratio and tensile breaking strength in the longitudinal direction do not stay within specified ranges of the present invention. In Comparative Examples 2 and 3, since ε-caprolactone was not used and the film was not subjected to relaxation in the longitudinal direction after lengthwise drawing, the absorbancy ratio in the width direction is too high. In particular, in Comparative Example 3, since the drawing temperature in the transverse direction was low (Tg+20° C.), the orientation in the transverse direction was extremely high, and it is presumed that the stress applied to the molecular chains was high. While the film is subjected to aging, the film has a strong tendency to relax the stress applied to the molecular chains, and it can be said that this has led to an increase in the enthalpy relaxation amount and an increase in the natural shrinkage rate.

On the other hand, Comparative Example 4 is also an example in which ε-caprolactone is not used, but an example in which biaxial drawing in the lengthwise and transverse directions was performed. However, since the film was not subjected to relaxation in the longitudinal direction, the lowering in performance was caused during aging, and this has resulted in a lowered hot-water heat shrinkage at 70'12 after aging and the deterioration in finish properties.

INDUSTRIAL APPLICABILITY

The heat-shrinkable polyester film of the present invention has excellent properties as describe above, thus it can be used suitably as a label application for bottles. The package be attached the label using the heat-shrinkable polyester film of the present invention as a label, shows a good appearance.

EXPLANATION OF REFERENCE NUMERAL

F: Film

The invention claimed is:

1. A heat-shrinkable polyester film, having an ethylene terephthalate unit, and containing a constituent unit derived from butanediol in a content of 1 to 25% by mole, a constituent unit derived from ε-caprolactone in a content of 1 to 25% by mole, and a constituent unit derived from one or more monomers capable of forming an amorphous component other than the constituent units derived from butanediol and ε-caprolactone in a content not less than 18% by mole in 100% by mole of the whole polyester resin component, the heat-shrinkable polyester film satisfying the following requirements (1) to (3):

(1) the film has a ratio A1/A2 (absorbancy ratio) of an absorbancy A1 at 1340 $cm^{-1}$ to an absorbancy A2 at 1410 cm$^{-1}$ measured by a polarized ATR-FTIR method of not less than 0.45 and not more than 0.75 in either of the width direction and longitudinal direction of the film;

(2) the film has a ratio (shrinkage stress in the width direction after 30 seconds/maximum shrinkage stress in the width direction) of a shrinkage stress in the width direction after 30 seconds when the film is heat shrunk in hot air of 90° C. for 30 seconds (shrinkage stress in the width direction after 30 seconds) to the maximum shrinkage stress in the width direction of not less than 75% and not more than 100%; and (3) the film has a hot-water heat shrinkage in the width direction of not less than 30% and not more than 55% when the film is aged for 672 hours in an atmosphere of 30° C. and 85% RH, and then the aged film is dipped in hot water of 70° C. for 10 seconds.

2. A heat-shrinkable polyester film, having an ethylene terephthalate unit, and containing a constituent unit derived from butanediol in a content of 1 to 25% by mole, a constituent unit derived from ε-caprolactone in a content of 1 to 25% by mole, and a constituent unit derived from one or more monomers capable of forming an amorphous component other than the constituent units derived from butanediol and ε-caprolactone in a content not less than 18% by mole in 100% by mole of the whole polyester resin component, the heat-shrinkable polyester film satisfying the following requirements (1'), (2) and (3):

(1') the film has a ratio A1/A2 (absorbancy ratio) of an absorbancy A1 at 1340 cm$^{-1}$ to an absorbancy A2 at 1410 cm$^{-1}$ measured by a polarized ATR-FTIR method of not less than 0.40 and less than 0.45 in either of the width direction and longitudinal direction of the film;

(2) the film has a ratio (shrinkage stress in the width direction after 30 seconds/maximum shrinkage stress in the width direction) of a shrinkage stress in the width direction after 30 seconds when the film is heat shrunk in hot air of 90° C. for 30 seconds (shrinkage stress in the width direction after 30 seconds) to the maximum shrinkage stress in the width direction of not less than 75% and not more than 100%; and (3) the film has a hot-water heat shrinkage in the width direction of not less than 30% and not more than 55% when the film is aged for 672 hours in an atmosphere of 30° C. and 85% RH, and then the aged film is dipped in hot water of 70° C. for 10 seconds.

3. The heat-shrinkable polyester film according to claim 2, having a natural shrinkage in the width direction of not less than 0.3% and not more than 2% when the film is aged for 672 hours in an atmosphere of 40° C. and 65% RH.

4. The heat-shrinkable polyester film according to claim 2, wherein the difference between the absorbancy ratio in the width direction of the film and the absorbancy ratio in the longitudinal direction of the film is less than 0.15.

5. The heat-shrinkable polyester film according to claim 2, having a hot-water heat shrinkage in the width direction of not less than 30% and not more than 55% when the film is dipped in hot water of 70° C. for 10 seconds.

6. The heat-shrinkable polyester film according to claim 2, having a hot-water heat shrinkage in the width direction of not less than 40% and not more than 75% and a hot-water heat shrinkage in the longitudinal direction of not less than 0% and not more than 15% when the film is dipped in hot water of 98° C. for 10 seconds.

7. The heat-shrinkable polyester film according to claim 2, having a tensile breaking strength in the longitudinal direction of the film of not less than 80 MPa and not more than 200 MPa.

8. The heat-shrinkable polyester film according to claim 2, having a right-angled tearing strength per unit thickness in the longitudinal direction of the film of not less than 180 N/mm and not more than 330 N/mm after the film is shrunk by 10% in the width direction in hot water of 80° C.

9. A package comprising a label that is prepared from the heat-shrinkable polyester film according to claim 2 and that has a perforation or a notch, the label being formed by being allowed to cover at least a part of the outer periphery of an object to be packaged and then to shrink by heat.

10. The heat-shrinkable polyester film according to claim 1, having a natural shrinkage in the width direction of not less than 0.3% and not more than 2% when the film is aged for 672 hours in an atmosphere of 40° C. and 65% RH.

11. The heat-shrinkable polyester film according to claim 1, wherein the difference between the absorbancy ratio in the width direction of the film and the absorbancy ratio in the longitudinal direction of the film is less than 0.15.

12. The heat-shrinkable polyester film according to claim 1, having a hot-water heat shrinkage in the width direction of not less than 30% and not more than 55% when the film is dipped in hot water of 70° C. for 10 seconds.

13. The heat-shrinkable polyester film according to claim 1, having a hot-water heat shrinkage in the width direction of not less than 40% and not more than 75% and a hot-water heat shrinkage in the longitudinal direction of not less than 0% and not more than 15% when the film is dipped in hot water of 98° C. for 10 seconds.

14. The heat-shrinkable polyester film according to claim 1, having a tensile breaking strength in the longitudinal direction of the film of not less than 80 MPa and not more than 200 MPa.

15. The heat-shrinkable polyester film according to claim 1, having a right-angled tearing strength per unit thickness in the longitudinal direction of the film of not less than 180 N/mm and not more than 330 N/mm after the film is shrunk by 10% in the width direction in hot water of 80° C.

16. A package comprising a label that is prepared from the heat-shrinkable polyester film according to claim 1 and that has a perforation or a notch, the label being formed by being allowed to cover at least a part of the outer periphery of an object to be packaged and then to shrink by heat.

* * * * *